US007510595B2

(12) United States Patent
Freeman et al.

(10) Patent No.: US 7,510,595 B2
(45) Date of Patent: Mar. 31, 2009

(54) METAL OXIDE NANOPARTICLE FILLED POLYMERS

(75) Inventors: Benny D. Freeman, Austin, TX (US); Scott Matteucci, Austin, TX (US); Haiqing Lin, Menlo Park, CA (US)

(73) Assignee: Board of Regents, The University of Texas System, Austin, TX (US)

( * ) Notice: Subject to any disclaimer, the term of this patent is extended or adjusted under 35 U.S.C. 154(b) by 87 days.

(21) Appl. No.: 11/409,457

(22) Filed: Apr. 20, 2006

(65) Prior Publication Data
US 2007/0137477 A1    Jun. 21, 2007

Related U.S. Application Data

(60) Provisional application No. 60/673,264, filed on Apr. 20, 2005.

(51) Int. Cl.
    *B01D 53/22*    (2006.01)
(52) U.S. Cl. .................. 95/45; 95/50; 95/51; 95/54; 96/4; 96/11; 96/12; 96/13; 96/14
(58) Field of Classification Search ............ 96/4, 96/11, 12, 13, 14; 95/45, 50, 51, 54; 55/DIG. 5; 524/430, 431, 432, 433, 434
    See application file for complete search history.

(56) References Cited

U.S. PATENT DOCUMENTS

| 4,963,165 | A | 10/1990 | Blume et al. | |
|---|---|---|---|---|
| 5,591,250 | A | 1/1997 | Stern et al. | |
| 5,679,133 | A | 10/1997 | Moll et al. | |
| 6,626,980 | B2 * | 9/2003 | Hasse et al. | ............ 95/45 |
| 6,838,486 | B2 * | 1/2005 | Ryang | ............ 524/431 |
| 2004/0019143 | A1 * | 1/2004 | Koloski et al. | ........ 524/434 |
| 2005/0284294 | A1 * | 12/2005 | Lou et al. | ............ 96/11 |

FOREIGN PATENT DOCUMENTS

EP    1 743 691 A1 *    1/2007

OTHER PUBLICATIONS

Merkel, T.C. et al., "Ultrapermeable, Reverse-Selective, Nanocomposite Membranes", Apr. 2002, Science, vol. 296, pp. 519-522.*
Barsema, et al., "Functionalized Carbon Molecular Sieve membranes containing Ag-nanoclusters," *Journal of Membrane Science*, (2003), 219:47-57.
Coleman, M.R. and Koros, W.J., "Isomeric Polyimides Based on Fluorinated Dianhydrides and Diamines for Gas Separation Applications," *Journal of Membrane Science*, (1990), 50:285-297.

(Continued)

*Primary Examiner*—Jason M Greene
(74) *Attorney, Agent, or Firm*—Edwins S. Flores; Daniel J. Chalker; Chalker Flores, LLP

(57) ABSTRACT

The present invention includes a method, composition and apparatus for forming a nanoparticle filled polymer having similar gas selectivity and greater gas permeability than the native polymer. The nanoparticle filled polymer includes one or more polymeric materials and one or more nanoparticles dispersed within the one or more polymeric materials that increasing the permeability of the nanoparticle filled polymers relative to the permeability of the native polymer membrane.

23 Claims, 23 Drawing Sheets

OTHER PUBLICATIONS

Haraya, K., et al., "The Permeation of Gases Through A New Type Polymide Membrane," *Membrane* (1986), 11(1):48-52.

Hirayama, Y., et al., "Permeation Properties to $CO_2$ and $N_2$ of Poly-(ethylene oxide)-containing and Crosslinked Polymer Films," *Journal of Membrane Science* (1990), 160:87-99.

Kim, T. and Koros, W.J., Temperature effects on gas permselection properties in hexafluoro aromatic polyimides, *Journal of Membrane Science* (1989), 46:43-56.

Koper, O.B., et al., Alkaline-earth oxide nanoparticles obtained by aerogel methods. Characterization and rational for unexpectedly high surface chemical reactivities, *Chemistry of Materials* (1997), 9:2468-2480.

Lee, S.Y., et al., "Effect of Gas Composition and Pressure on Permeation Through Cellulose Acetate Membranes," *AIChE Symposium Series* (1988), 84:93-101.

Li, N, et al., Membrane Separation Processes in the Petrochemical Industry: Phase 2, Final Report, Sep. 30, 1987, Report to US Department of Energy.

Merkel, T., et al., "Effect of Nanoparticles on Gas Sorption and Transport in Poly(1-trimethylsilyl-1-propyne)," *Macromolecules*, (2003), 36:6844-6855.

Merkel, T., et al., Ultrapermeable, Reverse-Selective Nanocomposite Membranes, *Science* (2002) 296:519-522.

Patel, N. P., et al., "Highly CO[2]-permeable and selective polymer nanocomposite membranes," *Advanced Materials* (2003), 15(9):729-733.

Puleo, A. C. et al., "The effect of degree of acetylation on gas sorption and transport behavior in cellulose acetate," *Journal of Membrane Science* (1989), 47:301-332.

Schell, W.J., et al., "Recent Advances in Cellulosic Membranes for Gas Separation and Pervaporation," *Gas Separation & Purification* (1989), 3:162-9.

Vu, et al., Mixed matrix membranes using carbon molecular sieves—I. Preparation and experimental results *Journal of Membrane Science* (2003), 211:311-334.

Vu, D. Q. et al., Mixed Matrix Membranes Using Carbon Molecular Sieves II. Modeling Permeation Behavior, *Journal of Membrane Science* (2003), 211:335-348.

International Search Report and Written Opinion for PCT/US2006/015019 dated Nov. 19, 2007.

* cited by examiner

A B C

A

B

METAL OXIDE NANOPARTICLE FILLED POLYMERS

CROSS-REFERENCE TO RELATED APPLICATIONS

This application claims priority to U.S. Provisional Application Ser. No. 60/673,264, filed Apr. 20, 2005, the contents of which are incorporated by reference herein in its entirety.

The U.S. Government may own certain rights to this invention under DOE Grant No. DE-FG26-01 NT41280 and Grant No. DE-FG03-02 ER15362. Without limiting the scope of the invention, its background is described in connection with membrane and polymer separation of gas mixture components, as an example.

TECHNICAL FIELD OF THE INVENTION

The present invention relates generally to the separation of gases in a gas mixture, and in particular, to the combination of metal oxide nanoparticles with a polymer to adjust the overall membrane permeability to gases and vapors.

BACKGROUND OF THE INVENTION

Membranes and polymers have been used to separate, remove, purify or partially recover a variety of components from mixtures, e.g., gases including hydrogen, helium, oxygen, nitrogen, argon, carbon monoxide, carbon dioxide, ammonia, water vapor, methane and other light hydrocarbons. Generally, this separation is dependent on the permeability and the diffusion of the molecules through the polymer. For example, one of the components may selectively permeate the polymer and/or diffuse through the polymer more readily than another component of the mixture; whereas a relative non-permeating component passes less readily through the polymer than other components of the mixture.

The separation of diffusants (e.g., molecules or compounds) using a polymer is dependent on both the polymer and the diffusants. Therefore, there are many factors that influence diffusion, including: (1) the molecular size of the diffusant; (2) the physical state of the diffusant; (3) the composition of the polymer; (4) the morphology of the polymer; (5) the compatibility of the polymer and the diffusant; (6) the solubility limit of the diffusant within the polymer matrix; and (7) surface or interfacial energies of the polymer.

Diffusivity plays a role in the separation of the gases in a mixture and can be thought of on a simple level as relating to the size of the molecules diffusing through the polymer. Smaller molecules can more easily penetrate and diffuse through a polymer matrix. The separation of diffusants is also based on the relative permeability of the diffusant through the polymer. Permeability is a measure of the rate at which a particular gas moves through a membrane of a standard thickness under a standard pressure difference. Permeability depends both on the solubility of the permeating gas in the polymer and its diffusion coefficient. The diffusants contact one side of a polymer, which is selectively permeable, allowing the one diffusant to pass through the polymer more readily than another diffusant. The difference in permeability of the diffusants allows a diffusant to be separated when an appropriate membrane or polymer is selected.

Diffusivity is also dependant on the repulsive component of the interaction between molecules and the polymer. The free volume or the unoccupied volume of the polymer also plays a role in the diffusivity, with molecules diffusing more easily through a polymer with a higher free volume. Additionally, the polymer with a higher unoccupied volume often results results in less discrimination between diffusants on the basis of molecular size of all gases. The dynamics of the motion (e.g., rotation and vibration) of the subunits of the polymer affect the spacing between polymer subunits and thus influence the separation. Although unoccupied volume in a polymer is important in determining membrane separation characteristics, other factors are very significant in achieving improvements in such characteristics. These motions prevent the polymer from maintaining optimum spacing between polymer subunits for the desired separation. Generally, lower temperatures will reduce the frequency and amplitude of motions by the polymer matrix and thus affect the separation of the components.

The separation is dependent on other factors as well, e.g., the temperature, the specific properties of the membrane and the properties of the component gases of the gas mixture to be separated. Often, the permeability of a membrane to a gas decreases as the temperature decreases, whereas, the separation factor increases as the temperature decreases. Thus, in many instances the temperature is maintained at a relatively high level to increase the rate of gas permeation through the membrane; however, in some instances the temperature is maintained near or below ambient temperature.

Currently, stiff-chain, rigid, glassy polymers, rubbery polymers and elastomeric polymers have been used to separate mixtures of gas. Stiff-chain, rigid, glassy polymers (e.g., polysulfone, cellulose acetate and polyimide polymers) used for separation of gases and the gas diffusivity play a dominate role in the separation and the ability of gas molecules to permeate is size dependent. In glassy polymers, smaller gas molecules such as helium and hydrogen are more permeable than larger molecules such as oxygen, nitrogen and methane. However, because they are rigid and inflexible, glassy polymer membranes are typified by low fluxes, while rubbery or elastomeric polymers have polymer chains that are more flexible and less discriminating based on diffusant molecular size, and diffusant solubility effects can play a dominant role in selectivity. The flexible polymer chains are relatively permeable to many gases, but are often not very selective for one gas over another. Generally, permeability for rubbery polymers is much greater than for more rigid glassy polymers. Consequently, prior-art gas separation membranes tend to exhibit either high gas permeation rates at the sacrifice of high permselectivity or the inverse.

Currently in the art, it is not possible to predict the gas selectivity or the intrinsic permeability of a polymer for given gases under a given set of conditions from knowledge of the selectivity of another pair of gases, even under the same conditions (e.g. temperature, pressure) as it is dependent on the structure of the polymer, the morphology of the membrane, the gas composition and properties. The gas selectivity and permeability must be determined experimentally.

FIG. 1 is a graph comparing a filled rubbery polymer to the theoretical value given by Maxwell's model. The pure $CH_4$ permeability in filled natural rubber polymers is plotted as a function of ZnO particle concentration in the polymers and compared with the theoretical predictions given by Maxwell's model for spherical particles shown below.

$$\frac{P_C}{P_P} = \left( \frac{1 - \phi_f}{1 + \frac{\phi_f}{2}} \right)$$

Where $\phi_f$ is the volume fraction filler. $P_c$ and $P_p$ are the component permeability and the polymer permeability respectively. In FIG. 1, the dashed line represents value calculated by Maxwell's model for permeability in a permeable matrix filled with an increasing amount of impermeable, spherical particles (Barrer et al., J. Polymer Science, Part A: Polymer Chemistry, 1 (1963) 2565-2586). The graph illustrates the permeability as a function of particle concentration in the polymer, and shows a departure from the value predicted by Maxwell's model.

Other studies in the art have shown that loading polymers with various particles result in a reduction in the permeability, as seen in the table 1 below:

| Polymer | Particle | Particle Loading (vol. %) | Permeability Reduction (%) |
|---|---|---|---|
| PDMS[1] | Graphite | 6 | 34% ($N_2$) |
| SBR[2] | Carbon Black | 23 | 39% ($N_2$) |
| Polyester-amide[3] | Organoclay | 37.5 | 80% ($O_2$) |

[1]Lape et al., J. Membrane Science, 236, (2004), 29-37;
[2]Wang et al., Polymer, 46 (2005), 719-724; and
[3]Krook et al., Poly. Eng. And Sci., (2005), 135-141.

Still others have examined the addition of particles to polymers to alter gas separations but have actually seen a decrease in the permeability with increasing particle concentration. In spite of the considerable research effort in separation membranes and polymers there has been limited advances in gas separations. Furthermore, improvements in selectivity for one gas over another are generally obtained at the expense of permeability.

The foregoing problems have been recognized for many years and while numerous solutions have been proposed, none of them adequately address all of the problems in a single device, e.g., selective gas separation with improved permeability.

SUMMARY OF THE INVENTION

The present inventors recognized a need for a polymeric material that would allow for selective separation of various gases, while retaining acceptable permeability and diffusivity at a variety of temperatures. The present inventors also recognized that nanoparticles may be combined with polymers to form nanocomposite materials that impart properties that allow superior separation of gases. The present inventors recognized nanometer (e.g., 0.5 nm to 500 nm primary particle diameter) metal oxides may be added to the polymer matrix and processed to form a polymeric metal oxide material to achieve the desired performance properties.

The polymeric nanocomposites formulations of the present invention allow for the combination of components at the nanoscale level and provide improved gas separation. The metal oxide polymeric nanocomposite can be used to make materials with potentially superior separation performance than existing formulations. The present invention also includes a method of operation that improves the performance of gas separation and potentially enhances the performance of new membrane materials. The present inventors also recognized the need for a process for separating component gases of a gas mixture, which achieves a higher separation factor than currently is attained and with an acceptable permeability.

In accordance with the present invention, a method, a composition of matter and an apparatus are provided for the separation of gases that include a nanoparticle filled polymer having one or more nanoparticles dispersed within the one or more polymeric materials. The nanoparticle filled polymer behaves as a nanocomposite exhibiting higher permeability than the native polymer membrane. In some embodiments, the polymer is a rigid, glassy polymer having a glass transition temperature (Tg) greater than 150° C. In other embodiments, the polymer is a rubbery polymer. Other polymers have characteristics that are indicative of both glassy and rubbery polymers. In some embodiments the polymeric material exhibits higher permeability than the native polymer.

For example, the present invention includes nanoparticles which are added to the polymeric material. In some embodiments, the nanoparticles may be metal oxides including one or more atoms of Fe, Cr, Al, Ga, In, Hf, Sn, Zr, Mo, Ti, V, Co, Ni, Cu, Y, Ta, W, Pb, B, Nb, Ge, Pr, U, Ce, Er, Nd, Mg, Ca, Ba, Sr, Au, Si or combination thereof. Furthermore, the metal oxides may be formed from elements of the periodic table from Groups 2 through 13, part of Group 14 (silicon, germanium, tin, lead), part of Group 15 (antimony, bismuth), part of Group 16 (polonium), and the lanthanides and actinides. The particles may be metals or metal oxides; however, other nanoparticles are also contemplated and include semiconductor nanoparticles organic particles and/or inorganic nanoparticles. Furthermore, the diameter of the nanoparticles is between about 1.0 and 500 nm. The concentration of nanoparticles ranges from about 0.0 volume percent (%) to about 30 volume percent (%). However, some embodiments may contain concentrations of nanoparticles above 30 volume percent (%). In many embodiments, the one or more nanoparticles are substantially uniformly distributed within the polymer. In addition, the nanoparticles may be of similar types and compositions or different compositions and types to custom tailor the properties of the nanoparticle filled polymer.

In some embodiments, the polymer of the present invention include, e.g., poly(1-phenyl-2-[p-trimethylsilylphenyl] acetylene, poly(1-trimethylsilyl-1-propyne), poly(ethylene octene), crosslinked poly(ethylene oxide), and 1,2-polybutadiene. The polymers of the present invention and the nanoparticles of the present invention may be modified and/or substituted with one or more halogens, hydroxyl groups, alkyl groups, alkoxy groups, monocyclic aryl, acyl groups and combinations thereof. Furthermore, one or more functional groups may be added of modified on the polymer and/or the nanoparticles, e.g., ROOH, ROSH, RSSH, OH, $SO_3H$, $SO_3R$, $SO_4R$, COOH, $NH_2$, NHR, $NR_2$, $CONH_2$, and $NH-NH_2$, wherein R denotes, e.g., linear or branched hydrocarbon-based chains, capable of forming at least one carbon-based ring, being saturated or unsaturated; alkylenes, siloxanes, silanes, ethers, polyethers, thioethers, silylenes, and silazanes.

In accordance with the present invention, a process is also provided for the removal of one or more gases from a raw gas mixture, by passing the raw gas mixture through a feed line and contacting the raw gas mixture with a nanocomposite membrane. The nanocomposite membrane includes one or more nanoparticles dispersed within the one or more polymeric materials for separating one or more gases from the raw gas mixture.

A gas separation apparatus is provided that includes one or more polymeric materials, one or more nanoparticle materials dispersed within the one or more polymeric materials and one or more containers to contain the separated material.

For example, the present invention includes a nanocomposite material that has a polymer matrix with one or more metal oxide nanoparticles dispersed within the polymer matrix. The nanocomposite material of the present invention may be of the shape chosen from a microring, a microdisk, a microsphere, a microplate, a microline and a combination thereof.

The present invention also provides a method for making high permeability membranes with selectivities similar to the native polymer, by dissolving the polymeric material, adding one or more nanoparticle materials to the polymeric material, and polymerizing the polymeric material to form a nanocomposite.

The present invention also includes a method for making membranes that has extremely high permeabilities and high chemical stability in organic solvents by dissolving the polymeric material, adding one or more nanoparticles to the polymeric material to form a nanocomposite.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Figure 1:
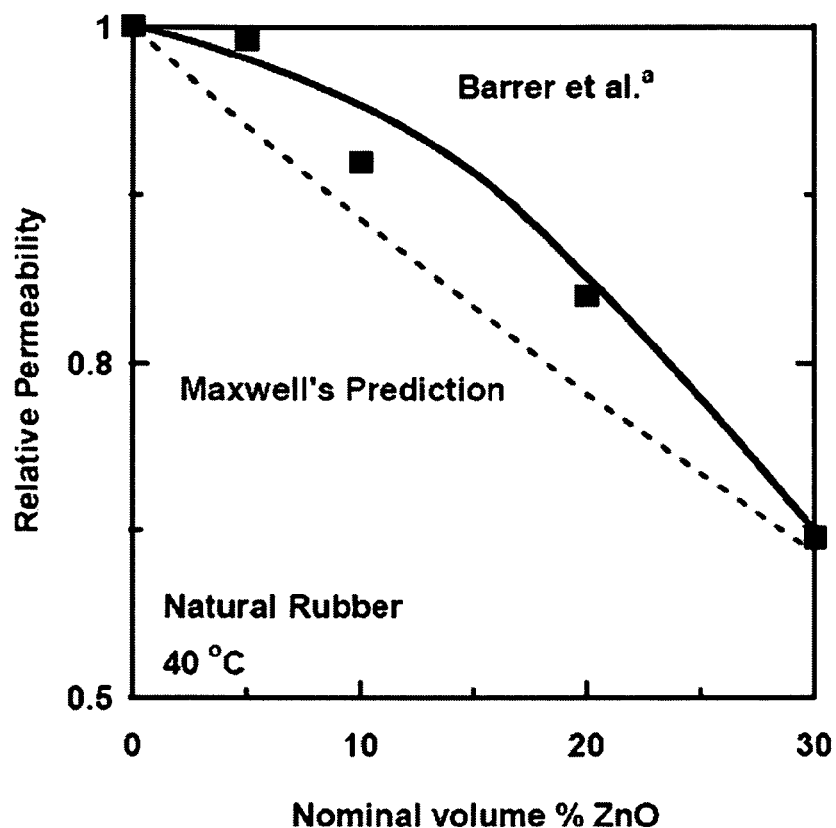
FIG. 1 is a graph comparing conventionally filled rubbery polymers to theoretical values.

While the making and using of various embodiments of the present invention are discussed in detail below, it should be appreciated that the present invention provides many applicable inventive concepts that can be embodied in a wide variety of specific contexts. The terminology used and specific embodiments discussed herein are merely illustrative of specific ways to make and use the invention and do not delimit the scope of the invention.

The present invention addresses a variety of separation problems in the art. The present invention provides high permeability membrane materials that require less membrane surface area or pressure differential across the membrane to achieve the desired gas flux. The metal oxide nanoparticle filled polymer has one or more metal oxide nanoparticles dispersed within one or more polymeric materials and provides similar gas selectivity and greater gas permeability than the native polymer. In some instances the higher permeability produced by the nanocomposite polymers of the present invention, allows the polymer membrane to be much thicker. In addition the present invention may be used for olefin-parafin separations, polar-nonpolar gas separations, separations $NO_x$, $SO_2$, $H_2S$ from hydrocarbons/inserts.

Generally, the term "alkyl", "alkenyl", "alkynyl" and "alkylene" refers to hydrocarbon chains typically ranging from about 1 to about 20 carbon atoms in length, preferably 1 to about 20 atoms, and includes straight and branched chains. Common embodiment include $C_1$ to $C_6$ alkyl (e.g., methyl ethyl or propyl).

As used herein, the term "metal oxides" include both metal oxides and metal hydroxides, metal hydrated oxides, metal oxohydroxides, or metal oxoperoxohydroxides. Furthermore, included within the term metal oxides are precursors of metal oxides such as nitrates, carbonates and acetates which can be converted to their corresponding metal oxides by heat treatment.

As used herein, the term "Glass Transition Temperature ($T_g$)" refers to Glass Transition Temperature ($T_g$) and can loosely be defined as a temperature point where a polymer experiences a significant change in properties.

As used herein, the term "halogens" refers to chlorine, fluorine, bromine, iodine and mixtures thereof.

As used herein, the term "hydroxyl groups" refers to the group —OH, the term "cyano" to the group —CN.

The term "alkenyl" denotes branched or unbranched hydrocarbon chains containing one or more carbon-carbon double bonds.

The term "alkylene" refers to a divalent alkyl group such as methylene(—$CH_2$—), propylene(—$CH_2\ CH_2\ CH_2$—), chloroethylene (—$CHClCH_2$—), 2-thiobutene —$CH_2$ CH(SH) $CH_2\ CH_2$, 1-bromo-3-hydroxyl-4-methylpentene(—CHBr$CH_2$ CH(OH)CH($CH_3$)CH $_2$—) and the like.

The term "alkynyl" refers to branched or unbranched hydrocarbon chains containing one or more carbon-carbon triple bonds.

As used herein, the term "alkoxy groups" refers to OR—, wherein R is alkyl.

As used herein, the term "alkyl groups" refers to a straight-chain or branched-chain alkyl group containing a maximum of 10, preferably a maximum of 3, carbon atoms, e.g., methyl, ethyl, n-propyl, 2-methylpropyl (iso-butyl), 1-methylethyl (iso-propyl), n-butyl, and 1,1-dimethylethyl(t-butyl).

The term "alkylcarboxyl" refers to an alkyl group substituted with a C(O)O group, for example, $CH_3$ C(O)O—, $CH_3$ $CH_2$ C(O)O—, etc.

The term "carboxy" refers to the group —C(O)OH.

As used herein, the term "monomer" refers to a chemical entity that can be covalently linked to one or more other such entities to form an oligomer or polymer.

As used herein, the term "nanoparticle" refers to particles that are on the order of $10^{-9}$ meter, or one billionth of a meter. The particles may be, e.g., monodisperse or polydisperse and the variation in diameter of the particles of a given dispersion may very, e.g., particle diameters of between about 0.1 to 100's of nm.

As used herein, the term "polymer" refers to oligomers, co-oligomers, polymers and co-polymers, e.g., random block, multiblock, star, grafted, gradient copolymers and combination thereof.

$O_2$ Enrichment. Currently, many elderly and sick people require $O_2$-enriched air to facilitate breathing. To maintain their standard of living, they take $O_2$ tanks with them in mobile units. Unfortunately, these tanks need to be refilled, and they are heavy. Both factors limit the convenience of such $O_2$ tanks. It would enhance the living standard of this group if $O_2$ could be generated on the spot in a lightweight system. Currently, such technologies do not exist or have significant drawbacks in terms of weight and/or power requirements.

With medical applications, it is not necessary to have $O_2$ at concentrations above 28%. In fact, it is possible to get $O_2$ poisoning when $O_2$ concentrations exceed 30%. Therefore, a membrane used for enriching the $O_2$ content in air does not require a very high $O_2/N_2$ selectivity. One problem with membranes has been their low permeability. Even PTMSP, which has $O_2$ permeability of 9,500 Barrers, is insufficient to allow $O_2$ enrichment without a driving force that essentially eliminates the convenience and weight savings of the membrane. However, metal oxide filled membranes are more than ten time more permeable than unfilled PTMSP at similar $O_2/N_2$ selectivity values. Therefore, the power required to create a sufficient driving force for enriched $O_2$ consumer applications is approximately 10 times smaller.

$H_2$ Venting. Although most fuel cell technologies require the use of $H_2$ or methanol as fuels, a technology exists that uses borohydride as the chemical energy source. The present invention provides numerous advantages over other fuel cells. However, borohydride degrades over time, and this degradation process releases $H_2$. Without venting $H_2$ pressure builds up, posing an explosion hazard due to high pressure and hydrogen's inherent flammability. Currently, polymeric membranes are being examined as a potential method for venting $H_2$ from such fuel cells. At a membrane thickness of 0.1 micron, the minimum estimated $H_2$ permeability for $H_2$ venting to ambient conditions is 3,000 Barrers, and this permeability must be maintained for more than 6 months. This is below the $H_2$ permeability of some polyacetylenes. However, polyacetylenes lose as much as 60% of its permanent gas permeability over 5 months, and its aging depends on storage conditions. Over time, the permeability loss due to aging can restrict the utility of unfilled polyacetylenes.

Although metal oxide filled polyacetylenes with nanoparticle loading below about 50 volume percent age at the same rate as unfilled polyacetylenes, they have an order of magnitude higher initial $H_2$ permeability. So, a 40 volume percent metal oxide filled polyacetylene membrane, with a $H_2$ permeability of 173,000 Barrers, that was 0.1 microns thick, would have to lose >98 percent of its initial permeability to fall below the specification noted above. This extent of permeability decrease has not been recorded for filled or unfilled polyacetylenes. Additionally, the extraordinarily high $H_2$ permeability permits the use of thicker membranes while still meeting the gas flux requirements. Thicker membranes allow for greater structural stability and reduced likelihood of pinhole defects, both of which are concerns for membrane systems. At sufficiently high nanoparticle loading no loss in permeability due to aging is observed.

The high permeability membrane materials of the present invention solve many design problems for membrane applications. In comparison to PTMSP (the polymer with the highest known gas permeability), metal oxide filled PTMSP would require as little as one tenth the membrane surface area or pressure differential across the membrane to achieve a gas flux equivalent to that of PTMSP.

The present invention is suited to address a variety of problems including gas separations, $O_2$ Enrichment and $H_2$ Venting. Furthermore, certain fruits and vegetables require $CO_2/O_2$ permeability ratios near 4 to maximize the shelf life of fruits and vegetables stored in packages, and this value is near the $CO_2/O$ selectivity for metal oxide filled PTMSP. Additionally, flue gas separations require removal of $CO_2$ from $H_2$ rich streams to reduce greenhouse gas emissions and prepare $CO_2$ for sequestration. Membranes, such as those described herein, that are more permeable to $CO_2$ than to $N_2$, could play a role in such separations. However, other embodiments of the present invention are more permeable to other gases, and therefore play a role in such separations.

The present invention teaches the addition of metal oxide nanoparticles (in some embodiments about 100 nm particle diameter) to high free volume, stiff chain, glassy polymers as a method for substantially increasing overall membrane permeability to gases and vapors. The present invention also demonstrates no significant change in $O_2/N_2$ selectivity at loadings of nanoparticles up to 40 volume percent. In some embodiments, enhancements in permeability allow for a reduction in membrane area and/or driving force required to achieve a desired gas flux.

The present invention includes the addition of metal-oxide nanostructured nanoparticles into polymers. The metal-oxide nanostructured nanoparticles of the present invention may contain a variety of components and the polymers may include stiff-chain, rigid, glassy polymers, rubbery polymers and elastomeric polymers.

As used herein, the term separation factor refers to the separation for a membrane for a given pair of gases "a" and "b" is defined as the ratio of the permeability constant of the membrane for gas "a" to the permeability constant of the membrane for gas "b."

The metal-oxide nanostructured materials of the present invention may be made from, e.g., Fe, Cr, Al, Ga, In, Hf, Sn, Zr, Mo, Ti, V, Co, Ni, Cu, Y, Ta, W, Pb, B, Nb, Ge, Pr, U, Ce, Er Nd, Mg, Ca, Ba, Sr, Au, Si or combinations thereof. Furthermore, metal-oxide-based materials is applicable to oxides formed from the following elements of the periodic table: Groups 2 through 13, part of Group 14 (silicon, germanium, tin, lead), part of Group 15 (antimony, bismuth), part of Group 16 (polonium), and the lanthanides and actinides. Additionally, synthesis of metal-oxide nanostructured materials have been carried out using inorganic salts, such as of $Fe^{3+}$, $Cr^{3+}$, $Al^{3+}$, $Ga^{3+}$, $In^{3+}$, $Hf^{4+}$, $Sn^{4+}$, $Zr^{4+}$, $Nb^{5+}$, $W^{6+}$, $Pr^{3+}$, $Er^{3+}$, $Nd^{3+}$, $Ce^{3+}$, $U^{3+}$, $Y^{3+}$ and combinations thereof. The present invention also includes nanostructured metal-oxides from the following elements of the periodic table, e.g., Groups 2 through 13, part of Group 14 (silicon, germanium, tin and lead), part of Group 15 (antimony and bismuth), part of Group 16 (polonium), and the lanthanides, actinides and combinations thereof. Furthermore, the nanoparticles may be a mixture of particles wherein the mixture is a homogeneous or heterogeneous mixture of nanoparticles.

As used herein, Glass Transition Temperature ($T_g$) can loosely be defined as a temperature point where a polymer experiences a significant change in properties. Typically, a large change in Young's Modulus is experienced. The $T_g$ is where a polymer structure turns "rubbery" upon heating and "glassy" upon cooling. Amorphous polymers are structural below $T_g$. Amorphous materials go through one stage of the change from a glassy to a rubbery consistency with a simultaneous loss in stiffness (modulus of elasticity or Young's Modulus). This stage of going from stiff to flowing is over a wide temperature range. Crystalline, materials, on the other hand, go through a stage of becoming leathery before becoming rubbery. There is a loss of stiffness (modulus of elasticity or Young's Modulus) in both of these stages. However, crystalline materials have a sharp, defined melting point.

As used herein, the term polymer refers generally to a rigid, glassy polymer, rubbery polymers or flexible glassy polymers. Glassy polymers are differentiated from rubbery polymers by the rate of segmental movement of polymer chains. Polymers in the glassy state do not have the rapid molecular motion that permit rubbery polymers their liquid-like nature and their ability to adjust segmental configurations rapidly over large distances (>0.5 nm). Glassy polymers exist in a non-equilibrium state with entangled molecular chains with immobile molecular backbones in frozen conformations. The glass transition temperature ($T_g$) is the dividing point between the rubbery or glassy state. Above the $T_g$, the polymer exists in the rubbery state; below the $T_g$, the polymer exists in the glassy state. Rigid, glassy polymers describe polymers with rigid polymer chain backbones that have limited intramolecular rotational mobility and are often characterized by having high glass transition temperatures.

The polymers may include, e.g., stiff chain, glassy polymers including: poly(1-phenyl-2-[p-trimethylsilylphenyl] acetylene (hereafter referred to as "PTMSDPA") and poly(1-trimethylsilyl-1-propyne) (hereafter referred to as "PTMSP") and elastomeric and rubbery polymers including poly(ethylene-co-octene). Typical polymers suitable for the present invention can be substituted or unsubstituted polymers and may include polysulfone, copolymer of styrene and acrylonitrile poly(arylene oxide), polycarbonate, and cellulose acetate, polysulfones; poly(styrenes), including styrene-containing copolymers such as acrylonitrilestyrene copolymers, styrene-butadiene copolymers and styrene-vinylbenzylhalide copolymers; polycarbonates; cellulosic polymers, such as cellulose acetate-butyrate, cellulose propionate, ethyl cellulose, methyl cellulose, nitrocellulose, etc.; polyamides and polyimides, including aryl polyamides and aryl polyimides; polyethers; poly(arylene oxides) such as poly(phenylene oxide) and poly(xylene oxide); poly(esteramide-diisocyanate); polyurethanes; polyesters (including polyarylates), such as poly(ethylene terephthalate), poly(alkyl methacrylates), poly(acrylates), poly(phenylene terephthalate), etc.; polysulfides; polymers from monomers having alpha-olefinic unsaturation other than mentioned above such as poly(ethylene), poly(propylene), poly(butene-1), poly(4-methyl pentene-1), polyvinyls, e.g., poly(vinyl chloride), poly(vinyl fluoride), poly(vinylidene chloride), poly(vinylidene fluoride), poly (vinyl alcohol), poly(vinyl esters) such as poly(vinyl acetate) and poly(vinyl propionate), poly(vinyl pyridines), poly(vinyl pyrrolidones), poly(vinyl ethers), poly(vinyl ketones), poly (vinyl aldehydes) such as poly(vinyl formal) and poly(vinyl butyral), poly(vinyl amides), poly(vinyl amines), poly(vinyl urethanes), poly(vinyl ureas), poly(vinyl phosphates), and poly(vinyl sulfates); polyallyls; poly(benzobenzimidazole); polyhydrazides; polyoxadiazoles; polytriazoles; poly (benzimidazole); polycarbodiimides; polyphosphazines; etc., and interpolymers, including block interpolymers having repeating units from the above such as terpolymers of acrylonitrile-vinyl bromide-sodium salt of para-sulfophenylmethallyl ethers; and grafts and blends having any of the foregoing. Typical substituents providing substituted polymers include halogens such as fluorine, chlorine and bromine; hydroxyl groups; lower alkyl groups; lower alkoxy groups; monocyclic aryl; lower acyl groups and the like.

The polymer may be made into a membrane for gas separation, however, films or hollow filaments or fibers, having a porous separation membrane, or substrate, and a coating in occluding contact with the porous separation membrane are also contemplated. The nanoparticles are added to the polymer matrix on a volume percent "nominal" basis. This "nominal volume percent" and "volume percent" are equivalent and defined as the volume of nanoparticles per volume of solid composite (i.e., volume of nanoparticles+the volume polymer). The metal oxide polymers of the present invention may be used to make a mixed matrix membrane which includes a polymer or small, discrete molecular sieving entities particles encapsulated in the polymer wherein the mixed matrix membrane contains metal oxide. The mixed matrix membrane may have more strength than the polymer alone may also be used. A mixed matrix membrane may also be used in the form of a dense film, tube or hollow fiber.

The present invention involves a method of making nanostructured metal-oxide polymers. The present invention also involves a method of making metal nanostructured polymers, wherein metal nanoparticles fill the polymer. Metal nanostructured materials may be synthesized starting with salts of Fe, Cr, Al, Ga, In, Hf, Sn, Zr, Mo, Ti, V, Co, Ni, Cu, Y, Ta, W, Pb, B, Nb, Ge, Pr, U, Ce, Er Nd, Mg, Ca, Ba, Sr, Au, Si and combinations thereof. The present invention of making metal-oxide-based materials is applicable to oxides formed from the following elements of the periodic table: Groups 2 through 13, part of Group 14 (silicon, germanium, tin and lead), part of Group 15 (antimony and bismuth), part of Group 16 (polonium), and the lanthanides and actinides.

Metal nanostructured materials may use inorganic salts, such as of $Fe^{3+}$, $Cr^{3+}$, $Al^{3+}$, $Ga^{3+}$, $In^{3+}$, $Hf^{4+}$, $Sn^{4+}$, $Zr^{4+}$, $Nb^{5+}$, $W^{6+}$, $Pr^{3+}$, $Er^{3+}$, $Nd^{3+}$, $Ce^{3+}$, $U^{3+}$, $Y^{3+}$ and combinations thereof. The process is general and nanostructured metal-oxides from the following elements of the periodic table can be made: Groups 2 through 13, part of Group 14 (silicon, germanium, tin and lead), part of Group 15 (antimony and bismuth), part of Group 16(polonium), and the lanthanides and actinides.

Maxwell's model and all other conventional composite models teach that permeability decreases when impermeable particles are dispersed in permeable organic membranes. Not only has this prediction been verified experimentally by many researchers, but it is used in numerous applications to enhance barriers properties (e.g., carbon black in tires). The present inventors discovered that adding metal oxide nanoparticles (e.g., <100 nm particle diameter) result in high free volume, stiff chain, glassy polymers (e.g., poly 1-trimethylsilyl-1-propyne [PTMSP]) greatly increases membrane permeability, while maintaining selectivity near the values of the neat polymer cf Table 2).

TABLE 2

Gas transport properties of PTMSP with (filled) and without (unfilled) nanoparticles. PTMSP filled with MgO nanoparticles (approx. 3 nm in diameter), $SiO_2$ nanoparticles (about 5 nm in diameter) and fumed silica ("FS") nanoparticles (about 12 nm in diameter) are compared at 20 volume percent and PTMSP filled with MgO is also shown at 40 volume percent. Materials were tested at a pressure differential of 3.4 atm and 35° C.

| Polymers | $P_{H2}$ [Barrer] | $P_{CO2}/P_{H2}$ | $P_{O2}$ | $P_{O2}/P_{N2}$ |
|---|---|---|---|---|
| PTMSP unfilled | 18,000 | 1.6 | 9,500 | 1.3 |
| PTMSP filled 20 FS | 42,000 | 1.3 | 22.000 | 1.3 |
| PTMSP filled 20 $SiO_2$ | 55,000 | 1.5 | 29,000 | 1.3 |
| PTMSP filled 20 MgO | 62,000 | 1.6 | 33,000 | 1.3 |
| PTSMP filled 40 MgO | 173,000 | 1.3 | 95,000 | 1.3 |

(1 Barrer = 10.10 $cm^3$ (STP)-cm/$cm^2$-s-cmHg)

Permeability of a gas A, $P_A$, through a membrane of thickness 1 is defined as follows:

$$P_A = \frac{N_A l}{(p_2 - p_1)}$$

Where $N_A$ is the steady state flux through the membrane and $p_2$ and $p_1$ are the feed and permeate pressures, respectively. Pure gas selectivity, a $P_A/P_B$, is defined as the ratio of permeabilities of the two components:

$$\alpha_{A/B} = P_A/P_B$$

Glassy, stiff chain polyacetylenes have the highest permanent gas permeabilties of any known family of polymers (e.g., $H_2$ permeability is 18,000 Barrer at 3.4 atm and 35° C. in PTMSP). However, even this permeability is too low for certain applications. When metal oxide nanoparticles are added to polymers such as PTMSP, the resulting nanocomposite film can achieve a $H_2$ permeability of 173,000 Barrer at 3.4 atm and 35° C. Such nanocomposite films also maintain an O/$N_2$ pure gas selectivity of 1.3, while $O_2$ permeability values reach 95,000 Barrer. Therefore, metal oxide nanoparticle filled polyacetylenes obtain permeabilities over ten times higher than the most permeable polymeric membrane materials known.

Studies by Merkel, et al. using PTMSP with surface treated fumed silica show enhanced permanent gas and vapor permeability. (Merkel, T., et al., Macromolecules, 6844-6855, 36, (2003). However, the PTMSP/FS system has −50% lower permanent gas permeability than MgO filled PTMSP and 25% lower permanent gas permeability than $SiO_2$ filled PTMSP at equivalent loadings and test conditions. Moreover, in the studies by Merkel et al., the permanent gas selectivity begins to decrease as fumed silica loading is increased. In contrast, in the materials of the present invention at the same loadings, $CO_2/H_2$ and $O_2/N_2$ selectivity remain unchanged for MgO and $SiO_2$ filled membranes. Finally, Merkel, et al., states that fumed silica cannot be added at concentrations above about 50 weight percent (25 volume percent) in PTMSP without the material becoming susceptible to the formation of selectivity destroying defects. (Merkel. T., et al., Macromolecules, 6844-6855, 36, (2003)). The metal oxide filled membranes of the present invention have been successfully prepared at loadings up to 40 volume percent, while still maintaining $O_2/N_2$ selectivity values at or near the values of the neat polymer.

The fumed silica used by Merkel has trimethylsilyl groups on the particle surface. (Merkel, T., et al., *Macromolecules*, 6844-6855, 36, (2003)). While this surface chemical functionality presumably helps compatibilize the fumed silica with the polymer membranes, it also prevents any strong interactions between the particle and polymer, which may be required to enhance permeability without decreasing selectivity. Both MgO and $SiO_2$ have no surface treatment and can interact with the polymer. Specifically, the MgO and $SiO_2$ are believed to undergo acid-base interactions with the trimethylsilyl group on PTMSP, and they could also undergo acid-base interactions with polar groups in other polymers.

The present invention also teaches the addition of nonporous metal oxide nanoparticles to stiff chain, glassy polymers for membrane applications. Counterintuitively, the nanoparticles increase the permeability of the membrane towards permanent gases. Certain nanocomposites have shown permeability enhancements of 1000% for $O_2$ and $H_2$ while $O_2/N_2$ selectivity is not changed.

High permeability membrane materials solve numerous design problems for membrane applications. Metal oxide filled stiff chain, glassy polymer membranes would require as little as one tenth the membrane surface area or pressure differential across the membrane to achieve a desired gas flux. Also, with higher permeability, the nanocomposite membrane can be much thicker than an unfilled stiff chain, glassy polymeric membrane. This eases processing design and reduces the likelihood of creating defects such as pinholes and tears in the membrane.

The present invention also provides the addition of nanoparticles to rubbery polymers as a method for substantially increasing the overall membrane permeability to gases and vapors. The present invention also provides metal oxide nanoparticles that are added to selected rubbery polymers, with no significant reduction in selectivity. Such enhancements to permeability allow for a reduction in membrane area and/or driving force (i.e. costs) required to achieve a desired gas flux. Photo and thermally-initiated crosslinking and/or further polymerization remain possible after the addition of nanoparticles to monomer or polymer solution. For instance, by dispersing nanoscale impermeable metal oxide particles into crosslinked poly(ethylene oxide) (hereafter referred to as "XLPEO"), the overall composite demonstrates substantially improved gas transport properties over those of the neat-polymer. XLPEO/MgO gas separation membranes selectively remove acid or polar gases such as carbon dioxide and hydrogen sulfide from mixtures with light gases, such as hydrogen, nitrogen and methane. The materials of the present invention exhibit excellent separation performance, i.e., high acid gas permeability and high selectivity of acid gases over nonpolar gases. By adding MgO to XLPEO, $CO_2$ permeability is increased up to about 17 times relative to the permeability of the unfilled polymer membrane, while $CO_2/CH_4$ pure gas selectivity remains about 9.8 at about 35° C. and about 4.4 atm.

Maxwell's model and all other conventional composite models teach that permeability decreases when impermeable particles are dispersed in permeable organic membranes. Not only has this prediction been verified experimentally by many researchers, but it is used in many applications to enhance barriers properties (e.g., carbon black in tires). Recently, we have discovered that adding nanoparticles to rubbery polymers can greatly increase membrane permeability while maintaining a reasonably high selectivity as seen in Table 3.

TABLE 3

Gas transport properties of rubbery polymer membranes with (filled) and without (unfilled) 20 volume percent MgO nanoparticles (about 3 nm in diameter). Samples were tested at Δp = about 4.4 atm and about 35° C. XLPEO-1 is a crosslinked unbranched rubbery polymer and XLPEO-2 is a crosslinked branched rubbery polymer:

| Polymers | PCO$_2$ [Barrer] | PCO$_2$/PH$_2$ | PCO$_2$/PCH$_4$ | PCO$_2$/PN$_2$ |
|---|---|---|---|---|
| XLPEO-1 unfilled | 120 | 8.0 | 19 | 60 |
| XLPEO-1 filled | 1700 | 4.5 | 9.8 | 25 |
| XLPEO-2 unfilled | 350 | 10 | 17 | 50 |
| XLPEO-2 filled | 940 | 10 | 14 | 43 |

(1 Barrer = 10$^{-10}$ (cm$^3$ (STP) cm)/(cm$^2$ s cm Hg)

It has been reported that adding particles to polymers reduce selectivity. (Vu, D. Q. et al., Journal of Membrane Science 2003, 211, 311-334, Barsema et al., *Journal of Membrane Science*, 2003, 219, 47-57). Vu et al. report that in Matrimid filled with carbon molecular sieve particles, CO$_2$/CH$_4$ selectivity is between about 7 and about 25% lower than the selectivity predicted by Maxwell's model, while the permeability is 30% lower than predicted. (Vu et al., *Journal of Membrane Science* 2003, 211, 335-348). By using branched rubbery polymers as the matrix for these nanocomposite membranes samples were prepared that suffer no loss of permanent gas selectivity while the permeability triples for permanent gases, where permanent gases include but are not limited to CO$_2$, H$_2$, O$_2$ and N$_2$. In the present invention, Maxwell's model does not predict a change in selectivity, rather it predicts about a 12% reduction in permeability. Thus, the materials of the present invention significantly outperform predictions from Maxwell's model.

The materials of the present invention can remove carbon dioxide from flue gas. Conventional membrane technology cannot compete with amine absorption in this application because commercial membranes used for CO$_2$ removal do not have sufficient separation performance. For example, a polyimide, which is potentially interesting for CO$_2$/N$_2$ separation, has a CO$_2$ permeability of about 60 Barrers and a CO$_2$/N$_2$ selectivity of only about 25 (Coleman, M. R and Koros, W. J., *Journal of Membrane Science*, 50, 285-297 (1990). However, simulations show that promising membrane materials should have CO$_2$ permeability coefficients of at least 100 Barrers and CO$_2$/N$_2$ selectivity values of around 70 (Hirayama, Y., et al., *Journal of Membrane Science*, 160, 87-99 (1999). Nanoparticle filled XLPEO can be potentially interesting for this application. At 35° C., filled XLPEO-2 exhibits a CO$_2$ pure gas permeability of 940 Barrers and a pure gas CO$_2$/N$_2$ selectivity of about 43 at about 4.4 atm. Higher permeability could compensate for the relatively low selectivity. With XLPEO, selectivity can be increased by lowering the operation temperature; the addition of nanoparticles is not expected to interfere with this phenomena.

H$_2$ is one of the most important industrial chemicals. The inherent advantage of H$_2$ as an energy source is attracting much attention as part of the future "hydrogen economy." Approximately 96% of the H$_2$ produced in the world is made from steam reforming of hydrocarbons followed by the water-gas shift reaction, and the final product (synthesis gas or syngas) contains H$_2$, CO$_2$, H$_2$S, H$_2$O, etc. Currently, acid gases such as CO$_2$ and H$_2$S are removed from synthesis gas by pressure swing adsorption ("PSA") or absorption technologies. PSA is subject to large gas losses due to venting and low-pressure purge operations. Absorption technologies generally have high capital costs, large energy and operational expenses and use toxic chemicals as the absorbent. Based on the current annual hydrogen production of 9 million tons in the United States alone and the potential for increasing demand, even a small improvement in the efficiency of H$_2$ purification could lead to enormous cost and energy savings. A membrane process could be an alternative to conventional processes because it is simple, compact and less energy intensive. However, conventional membrane systems are not competitive in this application because commercially available membranes are hydrogen selective. The desired hydrogen product is produced at low pressure by the membrane, and the hydrogen product is typically utilized at pressures equal to or higher than the feed pressure. The recompression costs associated with repressurizing the hydrogen to feed pressure are prohibitive. The lack of available commercially-developed acid gas-selective membranes with high acid gas permeability and high acid gases/H$_2$ selectivity is a principal limitation inhibiting widespread adoption of membrane-based gas separation for this separation. The materials described in this disclosure are significantly more permeable to acid gases than to H$_2$ so they may be of interest for H$_2$ purification.

H$_2$S is an acid gas that is often present in syngas generated from coal. H$_2$S is known to poison many metal catalysts and fuel cells. Thus removing H$_2$S from H$_2$ rich streams is critical for many industrial and alternative energy applications. CO$_2$ typically provides a conservative model marker penetrant for H$_2$S, and polymers of interest can be 2-4 times more permeable to H$_2$S than to CO$_2$. XLPEO-1, prepared from 100% PEGDA with 20 volume percent (%) MgO exhibits a CO$_2$ permeability of 1700 Barrers and a pure gas CO$_2$/H$_2$ selectivity of about 4.4 at about 4.4 atm and about 35° C. as compared to a CO$_2$ permeability of 120 Barrers and a CO$_2$/H$_2$ selectivity of about 8.2 for the unfilled membrane. Typically, mixed gas CO$_2$/H$_2$ selectivity is close to or slightly lower than the pure gas selectivity. As a comparison, cellulose acetate, a standard industrial membrane material used for CO$_2$ removal from natural gas has CO$_2$ permeability of about 6 Barrers and CO$_2$/H$_2$ pure gas selectivity of about 0.42 at about 35° C.

The separation performance of our materials is further enhanced by introducing poly(ethylene glycol)methyl ether acrylate [PEGMEA] into the XLPEO-1 matrix. By adding PEGMEA to PEGDA, a branched copolymer of crosslinked PEO is created. When nanoparticles are added to such a branched copolymer the permeability increases substantially while selectivity remains constant. For example, XLPEO-2 prepared from 70 weight percent PEGDA and 30 weight percent PEGMEA and MgO (i.e. 20 volume percent based on total organic content of the final material), exhibits a CO$_2$ permeability of 940 Barrers and a pure gas CO$_2$/H$_2$ selectivity of 10 at 4.4 atm and 35° C.

Nanoparticle filled rubbery polymers are also an interesting platform for CO$_2$ removal from natural gas. Currently, glassy polymers, such as cellulose acetate and polyimide, are employed to remove CO$_2$, and these polymers achieve selective permeation of CO$_2$ based primarily on high diffusivity selectivity of CO$_2$ over CH$_4$. The high diffusivity selectivity can be compromised by plasticization of the polymer by higher hydrocarbons and carbon dioxide m the feed, especially at low temperatures. For example, at weight percent 35° C., cellulose acetate ("CA") exhibits a pure gas CO$_2$/CH$_4$ selectivity of 33 (Puleo, A. C. et al., *Journal of Membrane Science*, 47. 301-332 (1989)). However, in field studies at feed pressures of 870-905 psig, CO$_2$/CH$_4$ selectivity in gas mixtures decreased to 9-15 due to plasticization by CO$_2$ and higher hydrocarbons (Li, N, et al., Membrane Separation Processes in the Petrochemical Industry: Phase 2. Final Report, Sep. 30, 1987, Report to US Department of Energy). This value is near the ratio of the solubility of CO$_2$ to CH$_4$ in cellulose acetate (Puleo, A. C., et al., *Journal of Membrane Science*, 47. 301-332 (1989). On the other hand, filled XLPEO-1 exhibits a pure $CO_2$ permeability of 1700 Barrers and pure gas $CO_2/CH_4$ selectivity of 9.8 at 4.4 atm and 35° C. Plasticization does generally affect rubbery polymers and has been observed in XLPEO; however, even when highly plasticized the $CO_2/CH_4$ selectivity of XLPEO is still high. Therefore, under highly plasticizing conditions (e.g., high feed pressure and/or low temperature) filled XLPEO should have $CO_2/CH_4$ selectivity values similar to those of cellulose acetate, but filled XLPEO will be orders of magnitude more permeable.

The present invention also includes a nanocomposite rubbery polymer membrane material including metal oxide nanoparticles and one or more rubbery polymers. The present invention teaches the addition of nonporous nanoparticles to crosslinked rubbery polymers for membrane applications. Counterintuitively, the nanoparticles have been shown to increase the permeability of the membrane towards permanent gases. Certain nanocomposites have shown permeability enhancements of 3400% for $N_2$. These same membranes have a $CO_2$ permeability enhancement of 1400%, while selectivity is reduced only 40%. In other polymers, the permeability triples for permanent gases while the selectivity remains unchanged. Photo- and thermal-crosslinking and/or polymerization remain possible after the addition of nanoparticles to the monomer solution.

Flue Gas $CO_2$ removal: Polyimides are potential membrane material for flue gas separations. In nanoparticle filled rubbery polymers, $CO_2$ permeability has been documented as high as 1700 Barrers while maintaining $CO_2/N_2$ selectivity values of 25. If higher selectivity is required, tested samples have shown a $CO_2/N_2$ selectivity of 42 with a $CO_2$ permeability of 940 Barrers. Thus, compared to polyimides, nanoparticle filled rubbery polymers have $CO_2$ permeabilities 2-3 orders of magnitude higher than the incumbent materials while maintaining or enhancing $CO_2/N_2$ selectivity, as seen in Table 4.

TABLE 4

Gas transport properties of acid gas removing membrane materials for flue gas applications.

| Polymers | $P_{CO2}$ [Barrer] | $P_{CO2}/P_{N2}$ |
|---|---|---|
| Matrimid 5218* | 10 | 31 |
| Ultem 1000* | 1.5 | 28 |
| Nanoparticle filled Rubbery polymer | 940 | 43 |

*Matrimid and Ultem samples tested at Δp = 3.4 atm and 35° C., nanoparticle filled rubbery polymer tested at Δp = 4.4 atm and 35° C., (Vu, D. Q. et al., Journal of Membrane Science, 211, 311-334, (2003)).

Hydrogen Syngas Purification: Most polymer membranes used today for gas separation are more penneable to small molecules (e.g., $H_2$) than to larger molecules (e.g., $CO_2$), For the syngas separation mentioned earlier, membrane materials will be required which are more penneable to $CO_2$ than to $H_2$ so that the $H_2$ product stays at or near feed pressure. The membrane materials describe in this disclosure have the best combinations of $CO_2$ permeability and $CO_2/H_2$ separation factor of all known polymeric membranes. Some facilitated transport membranes exhibit higher separation factors, but these membranes are generally unstable (e.g., sensitive to humidity or contaminants in feed streams) and have not been commercialized.

Acid gas removal from syngas stream: Currently, no membrane has sufficient $CO_2/H_2$ selectivity to use for syngas removal. A recent study from the Research Triangle Institute suggests that in order for a membrane system to be competitive with amine absorption technology, the $CO_2/H_2$ selectivity would need to be around 20. Current polymers approach this threshold but do not meet it. PDMS, a commercial rubbery polymer, has a pure gas $CO_2/H_2$ selectivity of about 4.3 at about 35° C. Crosslinked poly(ethylene-co-oxide) [XL-PEO] has a $CO_2/H_2$ selectivity of about 10.8 at about 35° C. and Δp about 4.4 atm. This is very is similar to the $CO_2/H_2$ selectivity of about 10.3 for nanoparticle filled XLPEO. However, $CO_2$ permeability of filled XLPEO is triple the permeability of the unfilled material. Thus, nanoparticle filled rubbery polymers have a selectivity near the $CO_2/H_2$ selectivity requirements for syngas separation while surpassing competitive materials in $CO_2$ permeability.

Traditionally, the addition of impermeable particles to a rubbery polymer results in a reduction in permeability. Therefore, the addition of particles has been avoided for membrane applications. This invention teaches the addition of nanoparticles to rubbery polymers, to increase the overall membrane permeability. Moreover, when nanoparticles are added to selected rubbery polymers, there is no reduction in selectivity. Such enhancements in permeability allow for a reduction in membrane size and/or driving force required to achieve a desired gas flux.

One example of the nanocomposite preparation protocol for rubbery polymers: samples of a rubbery polymer (e.g., poly(ethylene-co-octane), 1,2-polybutadiene; however, a person of skill in the art will recognize that other polymers may be used) were added to toluene at about 1.5 grams/100 mL solution and allowed to stir until the polymer was dissolved. Depending on polymer solubility in the selected solvent, the temperature of the solution can be raised while mixing to allow the polymer to fully dissolve in the solvent. Nanoparticles were added to the polymer solution and mixed sufficiently to allow for good particle dispersion in the solution. In some embodiments, the nanoparticles are of a single type; however, other embodiments may contain mixtures of nanoparticles (e.g., differing sizes and/or compositions). The nanoparticle filled solution was allowed to stir (e.g., overnight with a magnetic stirring bar). The sample solution is then poured onto a clean, dry level casting plate and allowed to cast until the toluene was evaporated, which usually required two days. Persons of skill in the art will recognize that these procedures are intended to illustrate one embodiment and preparation; other preparation may be used to form different embodiments of the present invention.

One example of the nanocomposite polyacetylene preparation protocol. PTMSP Nanocomposite Film Preparation: Samples of PTMSP were added to toluene at 1.5 grams/100 mL solution and allowed to stir until the polymer was dissolved. Nanoparticles were added to the polymer solution and mixed using a Warring Handheld High Speed Blender at 15,000 rpm. The nanoparticle filled solution was allowed to stir overnight with a magnetic stirring bar. The sample solution was then poured onto a clean, dry level casting plate and allowed to cast until the toluene had completely evaporated, which usually required two days. All sample preparation involving particles was conducted in a closed glove box under an $N_2$ blanket with a feed pressure between about 1.5 and about 5 cm $H_2O$, and a relative humidity of about 0.0. Persons of skill in the art will recognize that these procedures are intended to illustrate one embodiment and preparation; other preparations may be used to form different embodiments of the present invention.

One example of the PTMSDPA nanocomposite film preparation: Samples of PTMSDPA were dissolved in toluene at 1 gram PTMSDPA to 100 ml toluene. The resulting solution was allowed to mix using a magnetic stirring bar for 24 hours. Once PTMSDPA was completely dissolved, the sample solution was cooled to about −10° C., while being stirred for 4 hours prior to the addition of MgO nanoparticles. Nanoparticles were added and the solution was shaken to disperse nanoparticles into the solution. Particle filled solution was allowed to stir for about 5 days at about −10° C. Particle filled solution was poured into a clean, dry and level casting plate in a fumed hood and covered by a Petri dish to slow evaporation. Casting took place at room temperature (about 23° C.). Persons of skill in the art will recognize that these procedures are intended to illustrate one embodiment and preparation; other preparation maybe used to form different embodiments of the present invention.

One example of the crosslinked poly(ethylene oxide) preparation protocol: The pre-polymer solution was prepared by adding 0.1 weight percent initiator (i.e., HCPK or Irgacure 2959) to PEGDA. After stirring, the solution was mixed with a known amount of ultrapure water to form the target composition before being sonicated for about 10 minutes to eliminate bubbles (Ultrasonic cleaner, Model FS60, Fisher Scientific, Pittsburg, Pa.). After about 1 hour of stirring, nanoparticles were added, while pre-polymer solution was stirring. When large amounts of nanoparticles were added to the pre-polymer, organic solvents were added to the pre-polymer solution to prevent the nanoparticle filled solution from becoming too viscous for mixing. In some studies, $N_2$ was bubbled through the solution for about 30 minutes prior to polymerization to remove dissolved oxygen. The solution was sandwiched between two quartz plates, separated by spacers to control film thickness. The solution was polymerized by exposure to 312 nm UV light in a UV Crosslinker (Model FB-UVXL-1000, Fisher Scientific) for 90 seconds at 3 mw/cm$^2$. The solid films obtained by this process were crosslinked three dimensional networks (i.e., gels) and contained a negligible low molecular weight polymer (i.e., sol) that was not bound to the network. The as-synthesized film was then immersed in a large amount of ultrapure water for at least 5 days to allow any sol to diffuse out of the gels. The water was changed daily.

The present invention provides a process for removing a gas from a raw gas mixture by passing the raw gas mixture through a feed line and contacting the raw gas mixture with a nanocomposite membrane. The nanocomposite membrane includes one or more polymeric materials and one or more nanoparticles dispersed within the one or more polymeric material. Then separating one or more gases from the raw gas mixture.

In addition the present invention provides a gas separation apparatus. The apparatus includes one or more nanoparticles dispersed within the one or more polymeric material and one or more containers to contain the separated material. A nanocomposite material is also provided that includes one or more nanoparticles dispersed within the polymer matrix. The nanocomposite material may be formed in a shape chosen from a microring, a microdisk, a microsphere, a microplate, a microline or a combination thereof.

The polymeric material includes one or more polysulfone, copolymer of styrene and acrylonitrile poly(alkylene oxide), polycarbonate, cellulose acetate, polysulfones; poly(styrenes), styrene-containing copolymers, acrylonitrilestyrene copolymers, styrene-butadiene copolymers, styrene-vinylbenzylhalide copolymers; polycarbonates; cellulosic polymers, cellulose acetate-butyrate, cellulose propionate, ethyl cellulose, methyl cellulose, nitrocellulose, polyamides, polyimides, aryl polyamides, aryl polyimides, polyethers, poly(alkylene oxides), poly(phenylene oxide), poly(xylene oxide); poly(esteramide-diisocyanate), polyurethanes, polyesters (including polyarylates), poly(ethylene terephthalate), poly(alkyl methacrylates), poly(acrylates), poly(phenylene terephthalate), polysulfides or combinations thereof. The one or more nanoparticles are substantially uniformly distributed within the polymer matrix; however that is not a necessity. The concentration of the one or more nanoparticles ranges from about 0 volume % to about 30 volume % but may be higher than 30 volume %. The polymer generally has a glass transition temperature ($T_g$) greater than 150 degrees C.; however, in some embodiments the glass transition temperature ($T_g$) may be less than 150 degrees C.

A rubbery polymer nanocomposite and a glassy polymer nanocomposite are provided that exhibits higher permeability than the native polymer. The rubbery polymer nanocomposite includes one or more polymeric material and one or more nanoparticles dispersed within the one or more polymeric material. The nanocomposite material exhibits higher permeability than the native polymer. The method for making high permeability membranes with similar gas selectivity and greater gas permeability than the native polymer by dissolving the polymeric material, adding one or more nanoparticles to the polymeric material and polymerizing the polymeric material to form a nanocomposite.

A method is also provided for making reactive membranes that have extremely high permeabilities and excellent chemical stability in organic solvents by dissolving the polymeric material and adding one or more nanoparticles to the polymeric material. The present invention also includes the products made by the process disclosed herein.

A metal oxide nanoparticle filled polymer is provided that has similar gas selectivity and greater gas permeability than the native polymer and contains one or more metal oxide nanoparticles dispersed within the one or more polymeric materials. The metal oxide nanoparticle filled polymer behaves as a nanocomposite exhibiting higher permeability than the native polymer membrane. The one or more polymeric materials may be a rigid, glassy polymer or a rubbery polymer. The polymeric material comprises poly(1-phenyl-2-[p-trimethylsilylphenyl]acetylene, poly(1-trimethylsilyl-1-propyne), poly(ethylene-co-octene), polybutadiene, poly (ethylene oxide) or a combination thereof. Furthermore, the polymeric material is a substituted polymer comprising one or more halogens, hydroxyl groups, lower alkyl groups, lower alkoxy groups, monocyclic aryl, lower acyl groups and combinations thereof. The concentration of the one or more metal oxide nanoparticles ranges from about 0 volume % to about 30 volume % and are substantially uniformly distributed within the polymer matrix.

Figure 2:
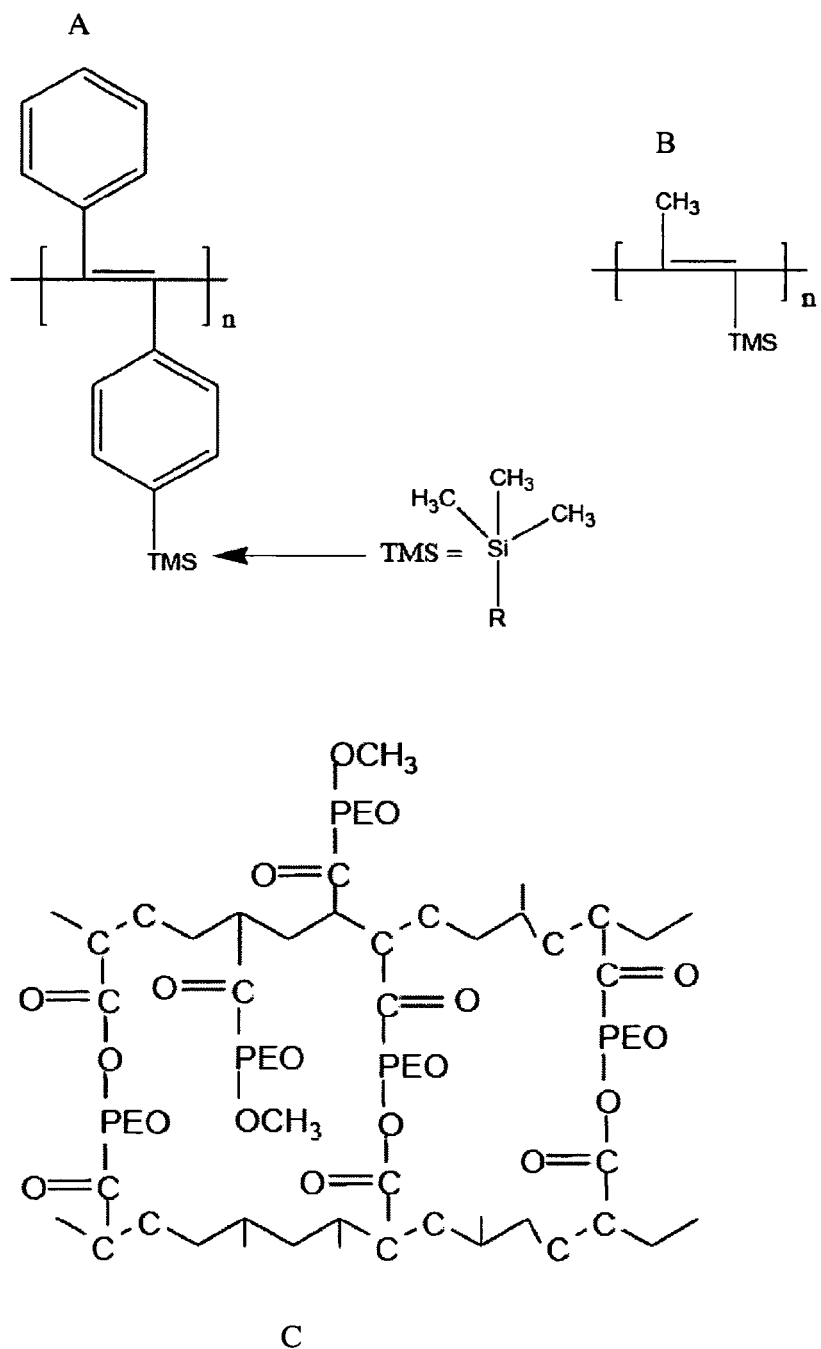
FIGS. 2A, 2B and 2C are illustrations of some of the polymers that may be used in the present invention.

FIG. 2 is an illustration of different polymers that may be used in the present invention. In this and subsequent graphs, permeability is often expressed in kBarrer, where 1 kBarrer=1000 Barrer. For example, FIG. 2A is poly(1-phenyl-2-[p-trimethylsilylphenyl]acetylene (PTMSDPA), FIG. 2B is poly(1-trimethylsilyl-1-propyne) PTMSP and FIG. 2C is XLPEO. The skilled artisan will recognize that these polymers are intended to be non-limiting examples and other polymers with and without modifications, substitutions and additions may be used. Many commercial metal oxide nanoparticles are environmentally and biologically inert and cost less than the matrix polymer material. Therefore they reduce overall membrane costs.

Figure 3:
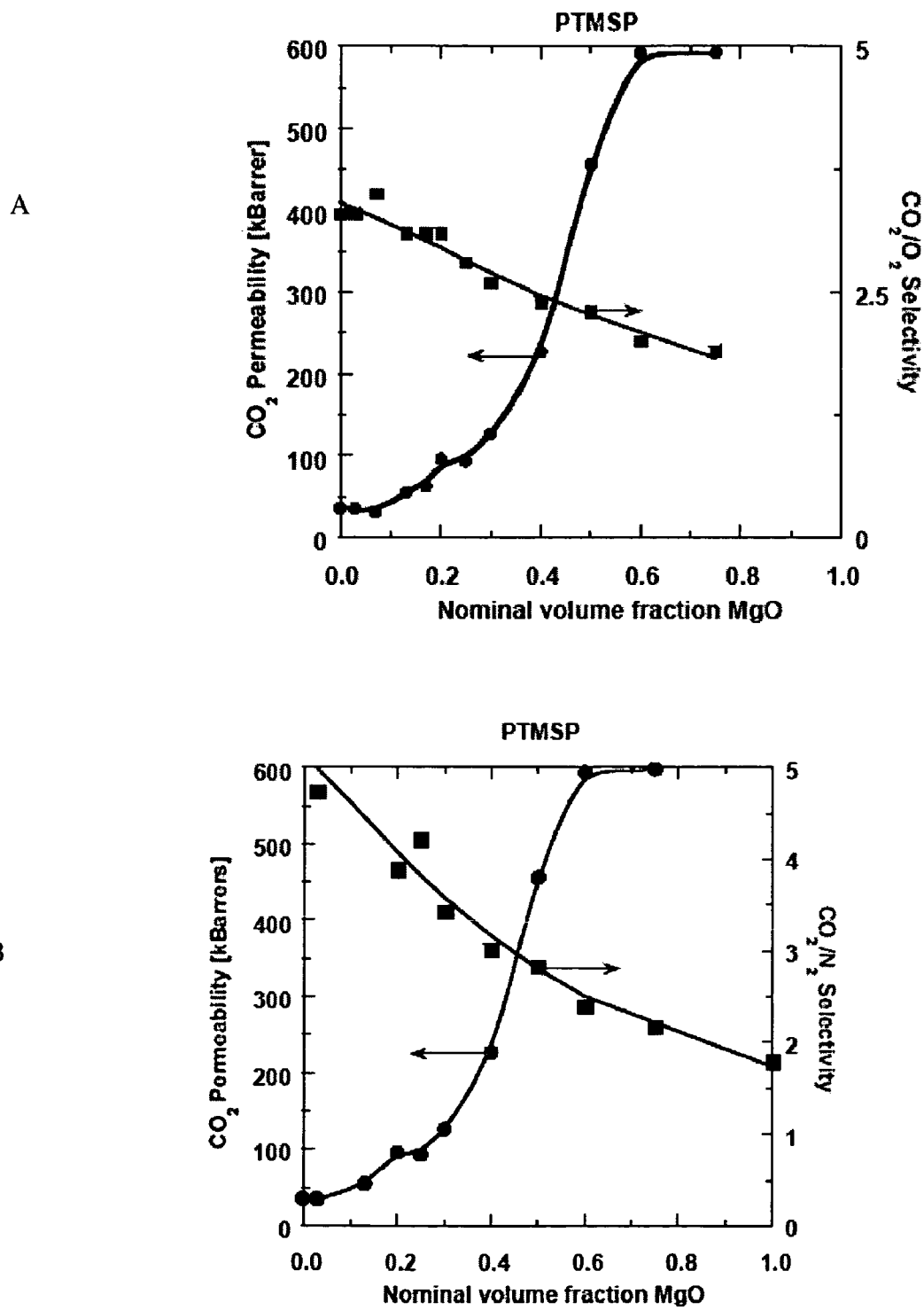
FIGS. 3A and 3B are graphs of the gas transport properties for gas pairs $CO_2/O_2/N_2$.

FIGS. 3A and 3B are graphs of the gas transport properties for the gas pairs $CO_2/O_2$ and $CO_2/N_2$. FIG. 3A is a graph of $CO_2$ permeability and $CO_2/O_2$ selectivity as a function of the nominal volume fraction of MgO in the PTMSP polymer. FIG. 3B is a graph of $CO_2$ permeability and $CO_2/N_2$ selectivity as a function of the nominal volume fraction of MgO in the PTMSP polymer.

Figure 4:
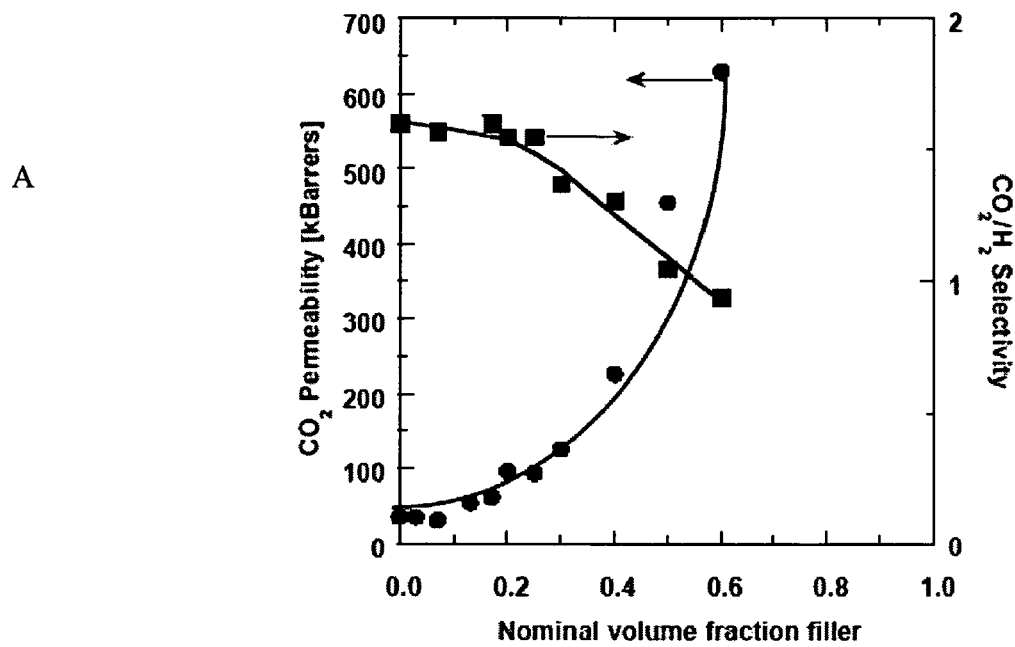
FIGS. 4A and 4B are graphs of the gas transport properties for $CO_2/H_2/CH_4$ gas pairs for a PTMSP/MgO Nanocomposite.
Figure 4:
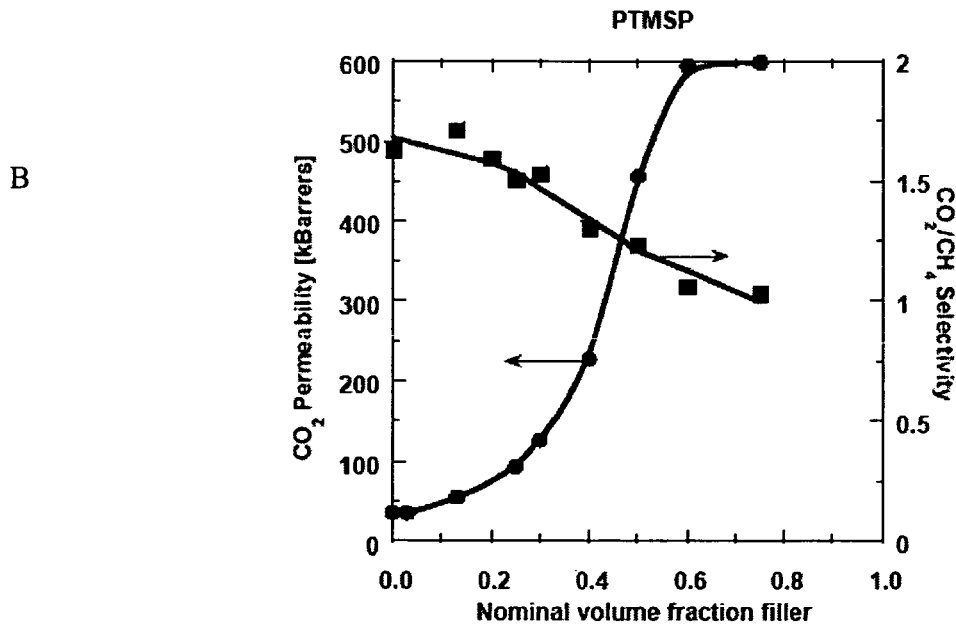

FIGS. 4A and 4B are graphs of the gas transport properties of PTMSP/MgO nanocomposites for $CO_2/H_2$ and $CO_2/CH_4$ gas pairs. FIG. 4A is a graph of $CO_2$ permeability and $CO_2/H_2$ selectivity as a function of the nominal volume fraction of a PTMSP polymer filled with MgO nanocomposite. FIG. 4B is a graph of $CO_2$ permeability and $CO_2/CH_4$ selectivity versus nominal volume fraction for one embodiment of the present invention.

Figure 5:
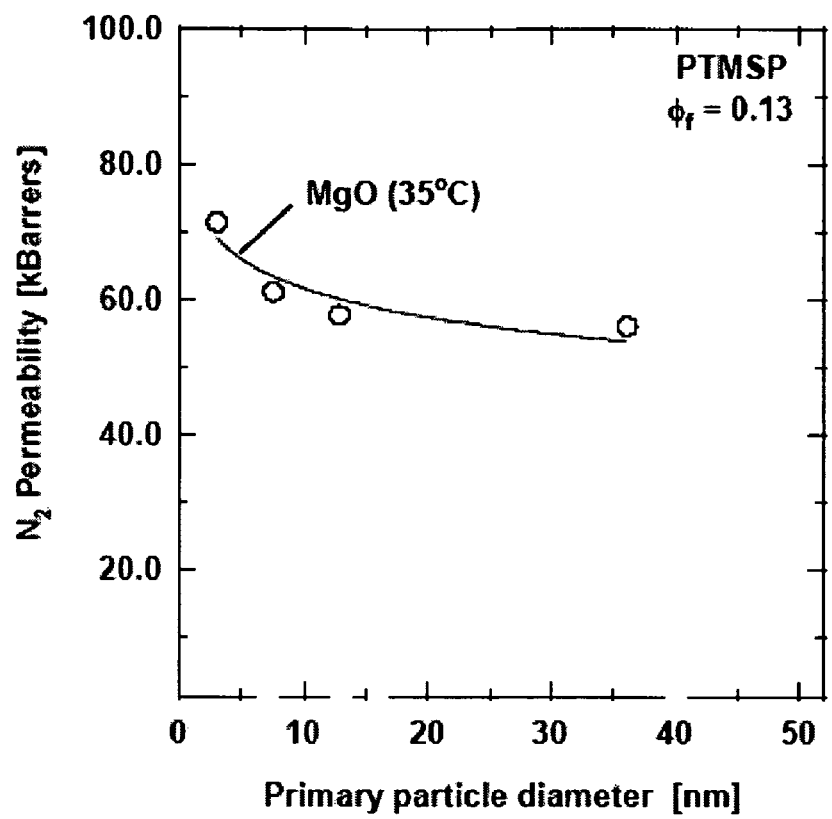
FIG. 5 is a graph of $N_2$ permeability as a function of MgO particle sizes.

FIG. 5 is a graph $N_2$ permeability verses particle size of MgO for one embodiment of the present invention. The graph was obtained with a PTMSP $\phi_f$ value of about 0.13 and the permeability was measured at 35° C.

Figure 6:
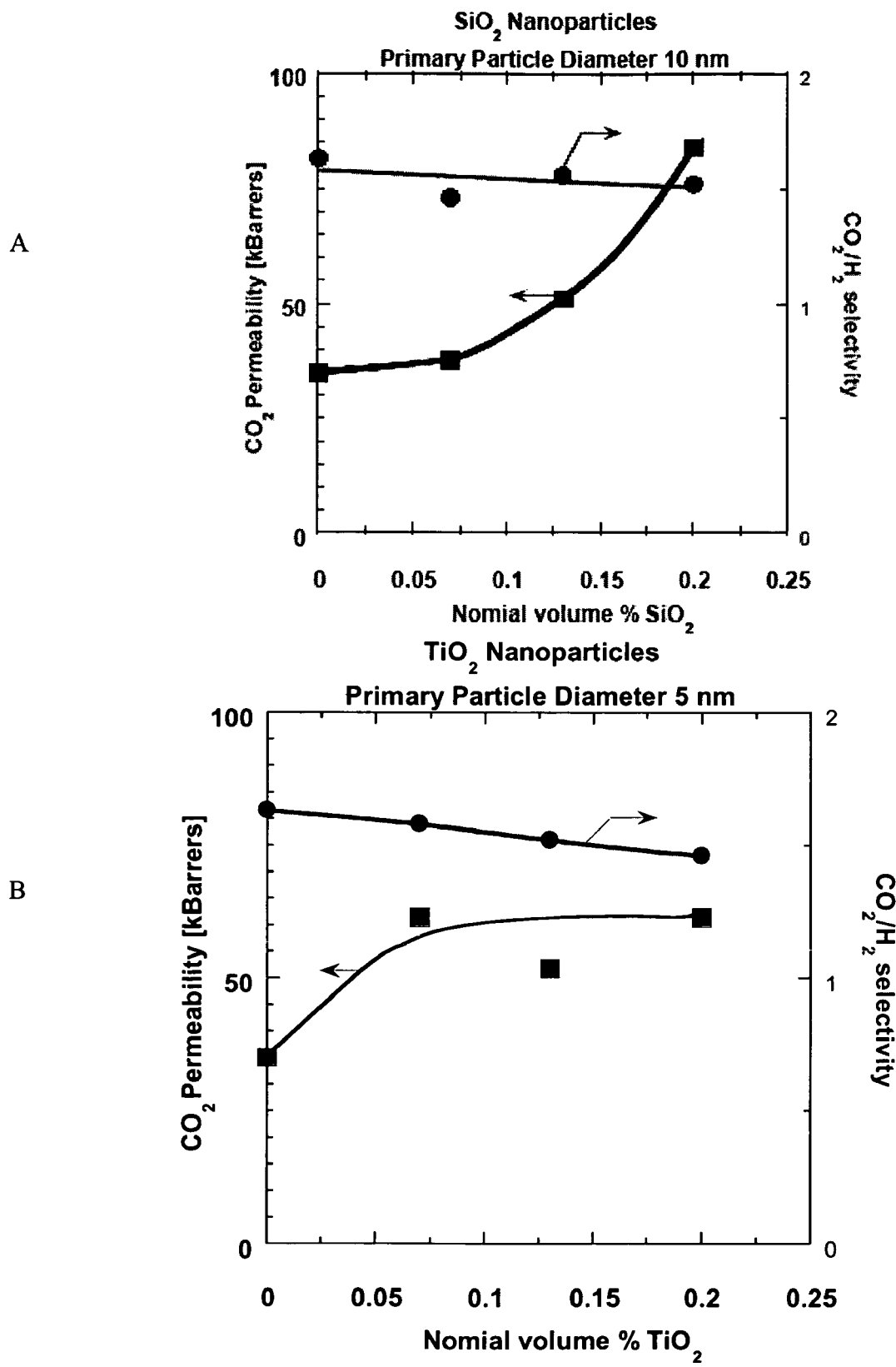
FIGS. 6A and 6B are graphs of the gas transport properties for $CO_2/H_2/CH_4$ gas pairs for a PTMSP/$SiO_2$ and a $TiO_2$ Nanocomposite.

FIGS. 6A and 6B are graphs of the gas transport properties for $CO_2$ permeability and $CO_2/H_2$ gas pair selectivity as a function of nanocomposite nominal volume percentage of particles. FIG. 6A includes $SiO_2$ nanoparticles with a diameter of about 10 nm in PTMSP and illustrates the $CO_2$ permeability and $CO_2/H_2$ gas pair selectivity. FIG. 6B is a graph of the $CO_2$ permeability and $CO_2/H_2$ gas pair selectivity including $TiO_2$ nanoparticles with a diameter of about 5 nm in PTMSP.

Figure 7:
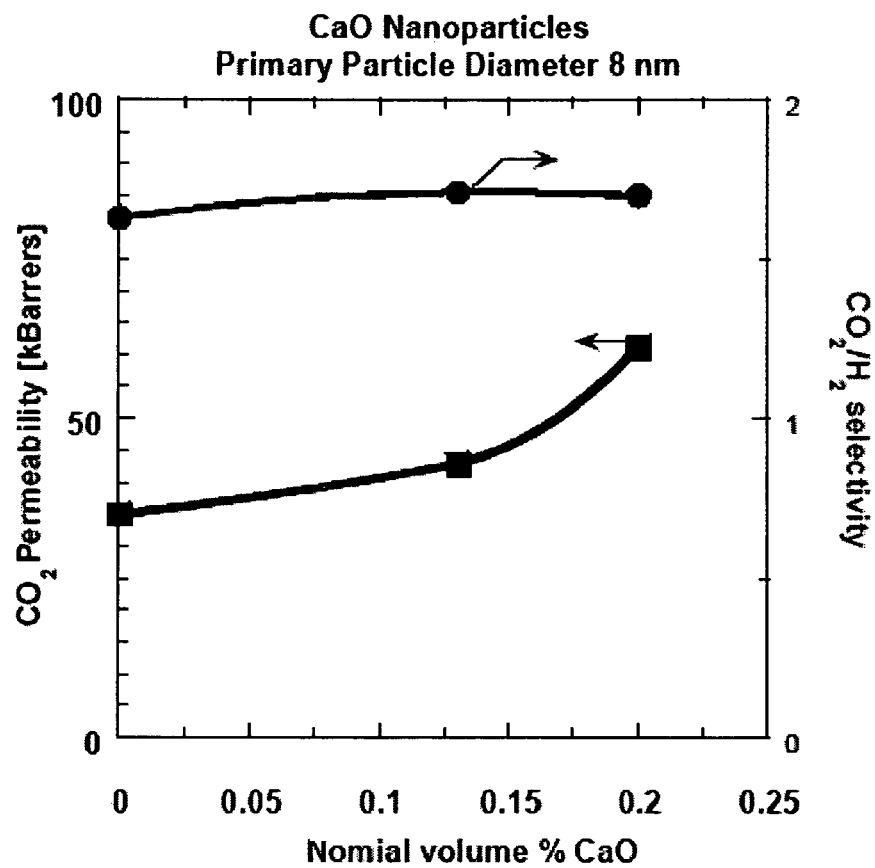
FIG. 7 is a graph of $CO_2$ permeability as a function of CaO nanoaprticles volume in PTMSP.
Figure 8:
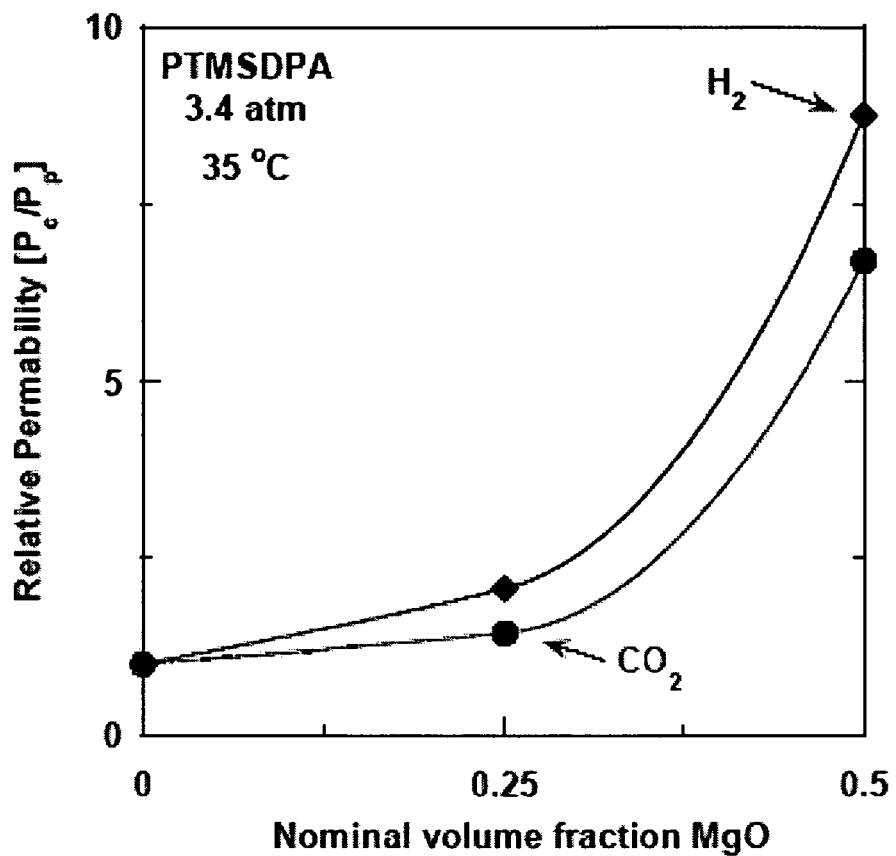
FIG. 8 is a graph of the relative permeability as a function of volume fraction of MgO nanoparticles in PTMSDPA.

FIG. 7 is a graph of one embodiment of the present invention having metal oxide nanoparticles in PTMSP to illustrate $CO_2$ permeability and $CO_2/H_2$ selective verses the nominal volume for CaO particles having a diameter of about 8 nm. FIG. 8 is a graph of the relative permeability of $CO_2$ and $H_2$ as a function of volume fraction of MgO nanoparticles in PTMSDPA at 3.4 atm and 35° C.

Figure 9:
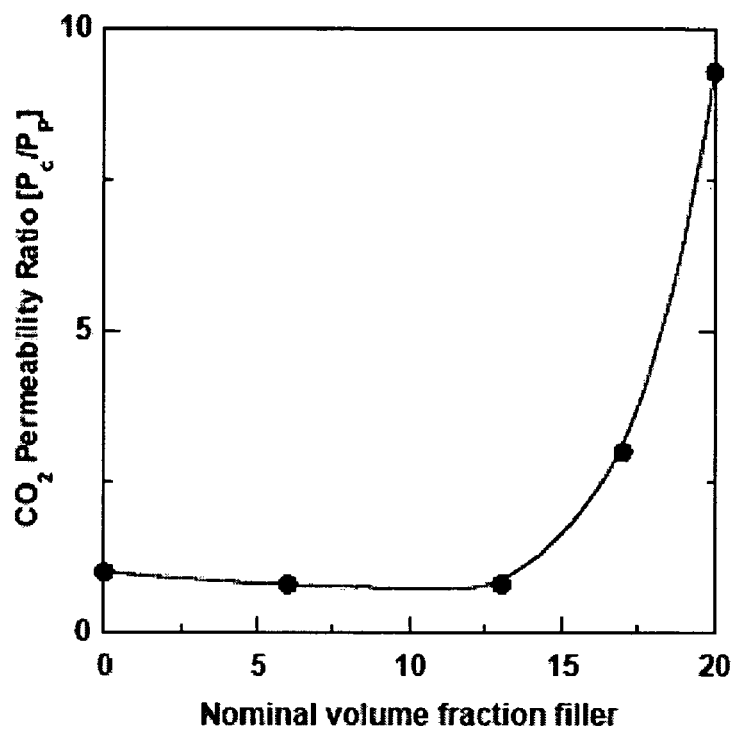
FIG. 9 is a graph the relative permeability as a function of volume fraction.

FIG. 9 is a graph of XLPEO nanocomposite gas transport properties of one embodiment of the present invention including the $CO_2$ permeability ratio as a function of the nominal volume fraction filler.

Figure 10:
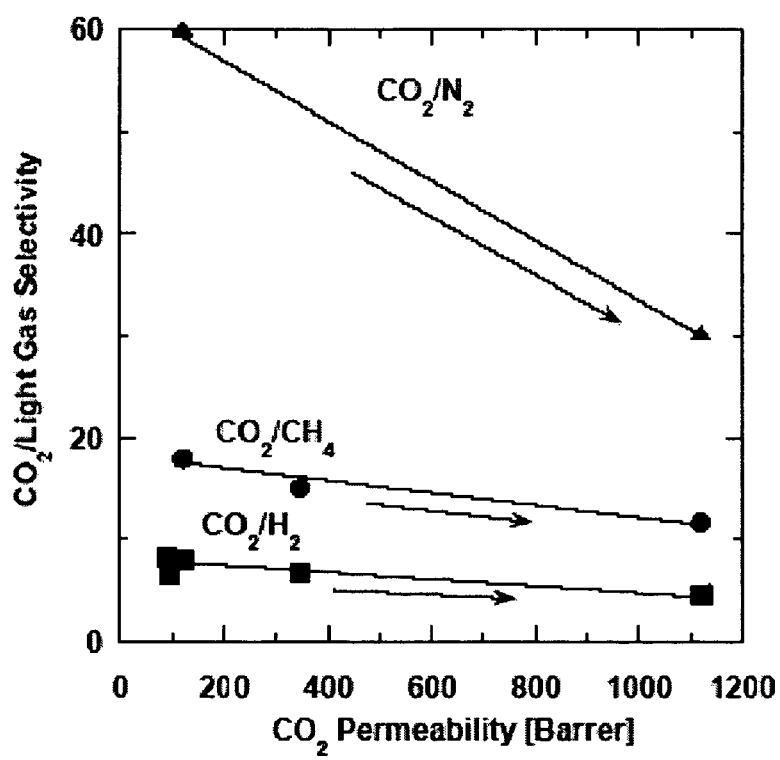
FIG. 10 is a graph of the gas selectivity as a function of the permeability.
Figure 11:
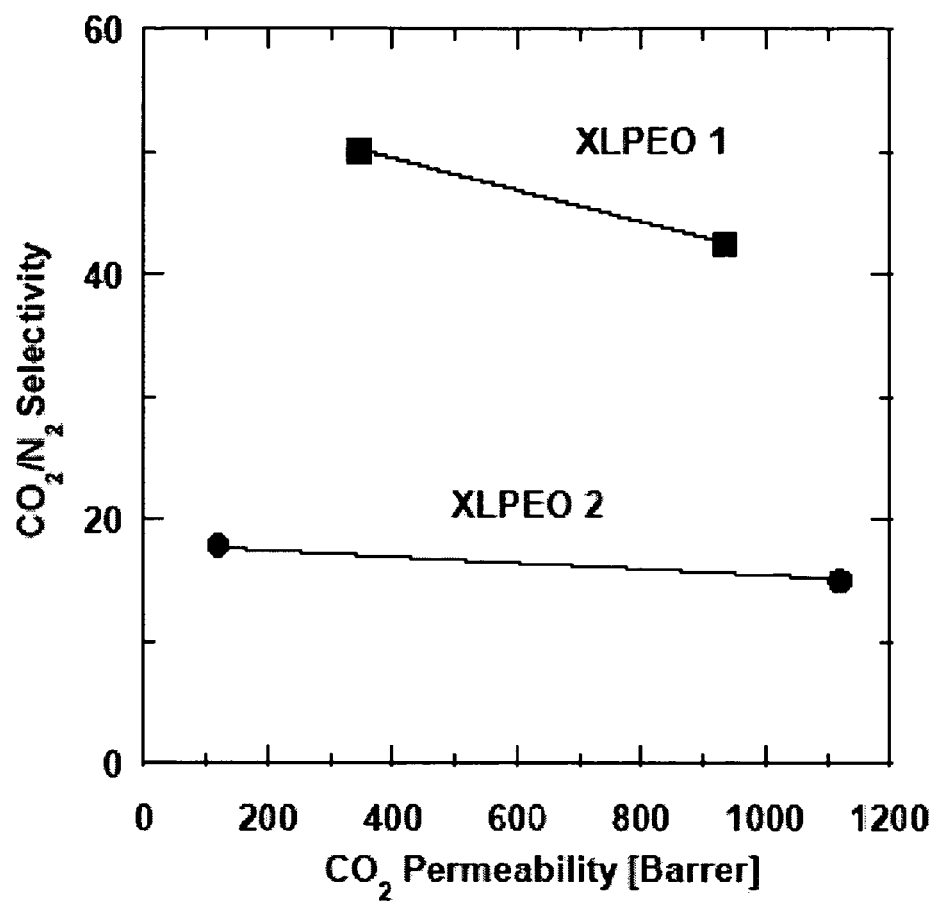
FIG. 11 is a graph of the gas selectivity as a function of the permeability for XLPEO nanocomposites.

FIG. 10 is a graph of $CO_2$ selectivity for light gases (e.g., $H_2$, $CH_4$ and $N_2$) verses $CO_2$ permeability for crosslinked poly(ethylene glycol) diacrylate (XLPEO) with MgO of about 3 nm primary particle diameter. FIG. 11 is a graph of the selectivity as a function of permeability. The graph shows $CO_2$ permeability and $CO_2/N_2$ selectivity in XLPEO1 and XLPEO2 nanocomposites.

Figure 12:
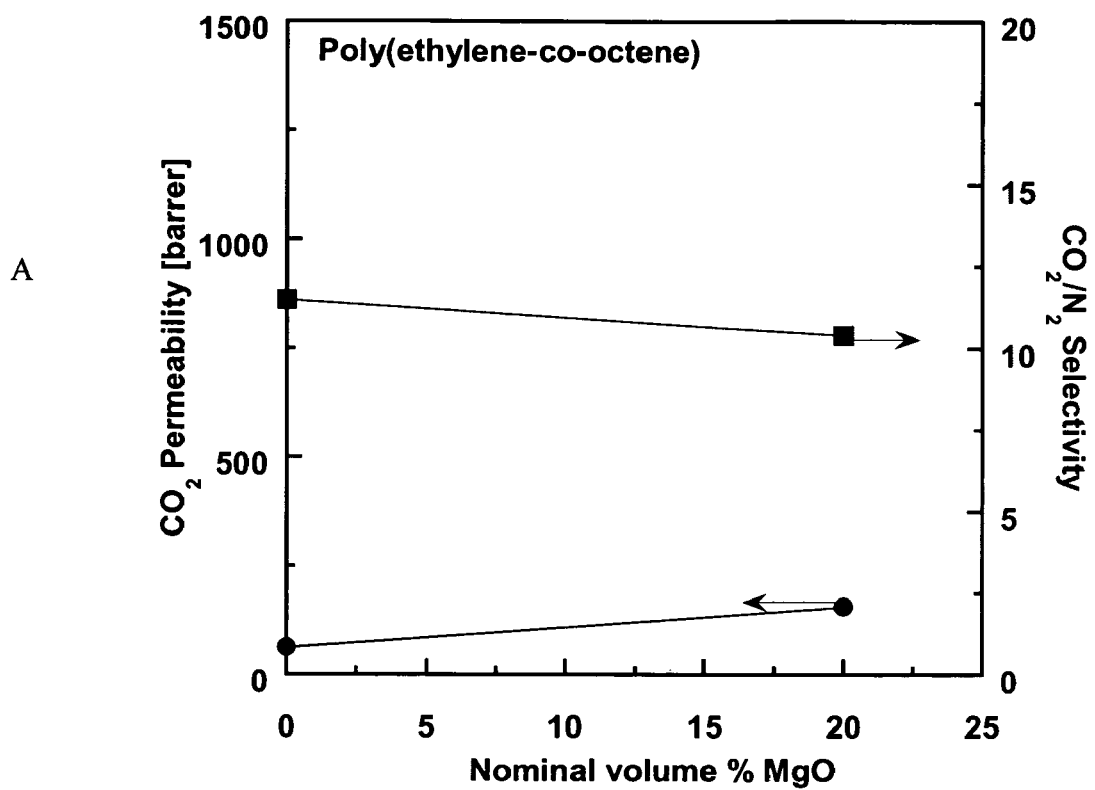
FIG. 12 is a graph of the gas transport properties for rubbery polymers.

FIG. 12 is a graph of $CO_2$ permeability and $CO_2/N_2$ selectivity as a function of nominal volume percent of MgO for the rubbery polymer poly(ethylene-co-octene) of one embodiment of the present invention.

Figure 13:
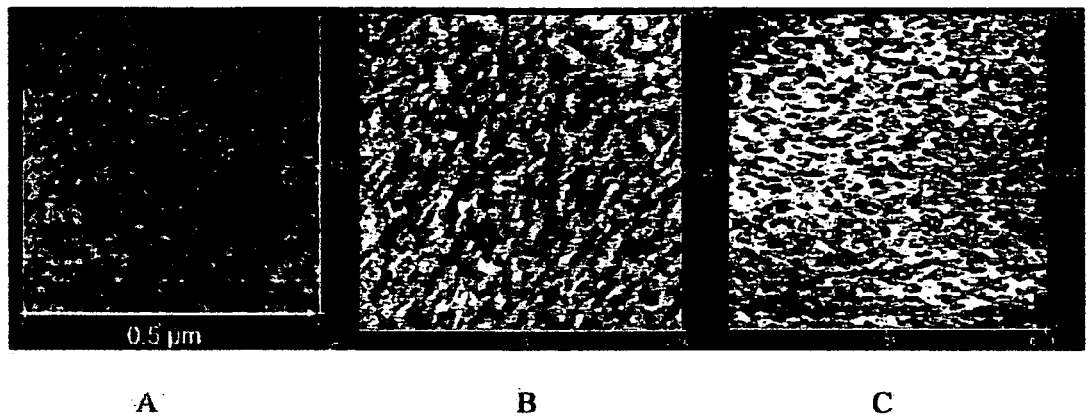
FIGS. 13A, 13B and 13C are AFM phase profile images of PTMSP/MgO nanocomposites.

FIGS. 13A, 13B and 13C are AFM phase profile images of PTMSP/MgO nanocomposites of one embodiment of the present invention. FIG. 13A is an image that has a particle loading (nominal vol. fraction) $\phi_f^N$ of about 0.13 and a $P_{CO_2}$ of about 53,000 Barrers. FIG. 13B is an image that has a particle loading (nominal vol. fraction) $\phi_f^N$ of about 0.20 and a $P_{CO_2}$ of about 96,000 Barrers. FIG. 13C is an image that has a particle loading (nominal vol. fraction) $\phi_f^N$ of about 0.25 and a $P_{CO_2}$ of about 106,000 Barrers.

Figure 14:
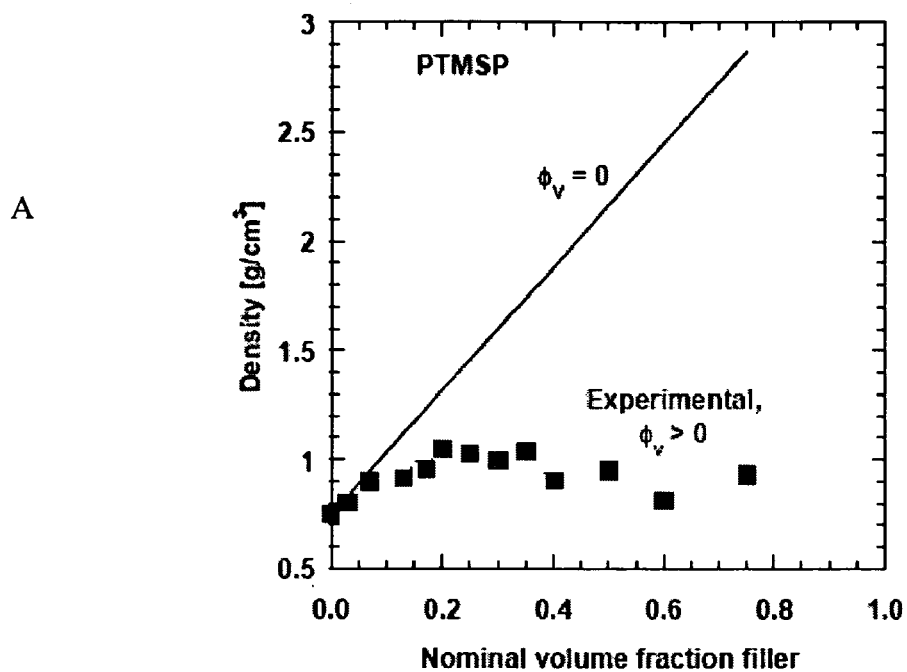
FIGS. 14A and 14B are graphs of density verses volume of fractions filtered.
Figure 14:
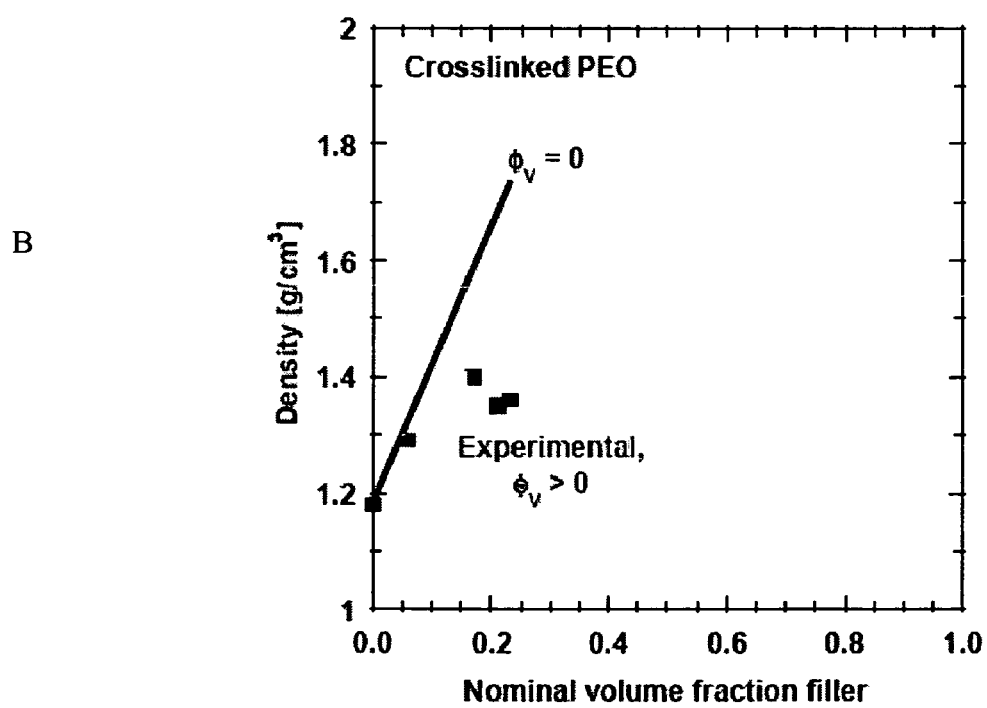
Figure 15:
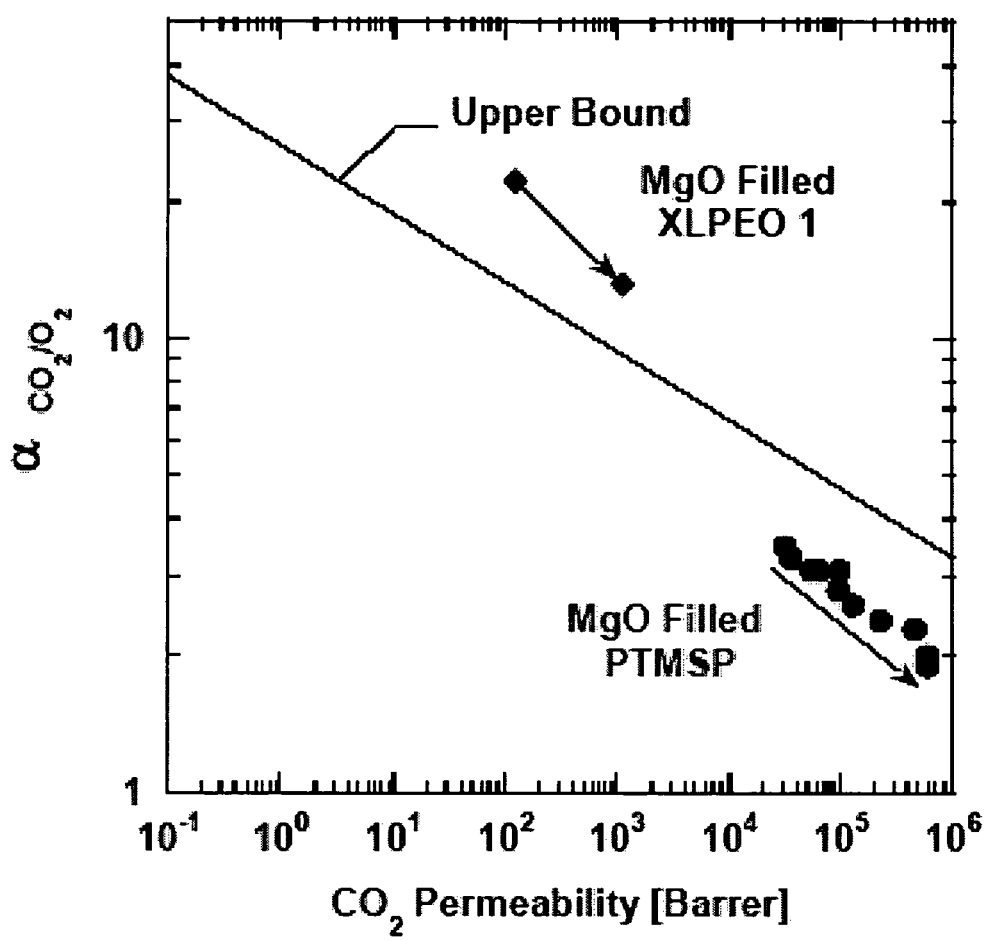
FIG. 15 is a graph of $CO_2/O_2$ gas transport properties for the nanocomposites of the present invention.

FIGS. 14A and 14B are graphs of the density as a function of nominal volume fraction filler for PTMSP and crosslinked PEO respectively. Wherein the additive density of the nanocomposite is given by:

$$\text{Additive Density} = \rho_c = (\rho_f \phi_f^N + \rho_p \phi_p^N)(1-\phi_V)$$

Where $\rho_f$ is the pure filler density, $\rho_p$ is the pure polymer density, $\phi_f^N$ is the nominal volume fraction of filler, $\phi_p^N$ is the nominal polymer volume fraction, and $\phi_V$ is the void volume fraction. The solid line indicates a simple additive model for the nanocomposite density where $\phi_V=0$. The MgO of the nanocomposite is about 3 nm primary particle diameter FIG. 15 is a graph of the $CO_2/O_2$ selectivity as a function of $CO_2$ permeability for MgO filled XLPEO1 and MgO filled PTMSP nanocomposite of one embodiment of the of the present invention. XLPEO1 nanocomposites lie above the upper bound, which defines the best permeability/selectivity values for polymeric materials.

Figure 16:
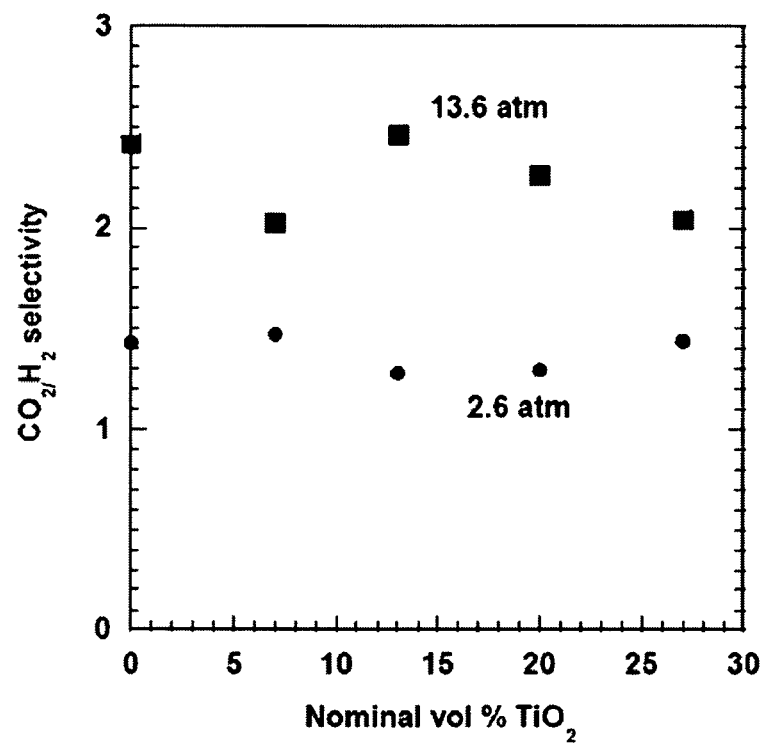
FIGS. 16A and 16B are graphs of $CO_2/H_2$ and $CO_2/H_2$ gas transport properties for one of the nanocomposite of the present invention.
Figure 16:
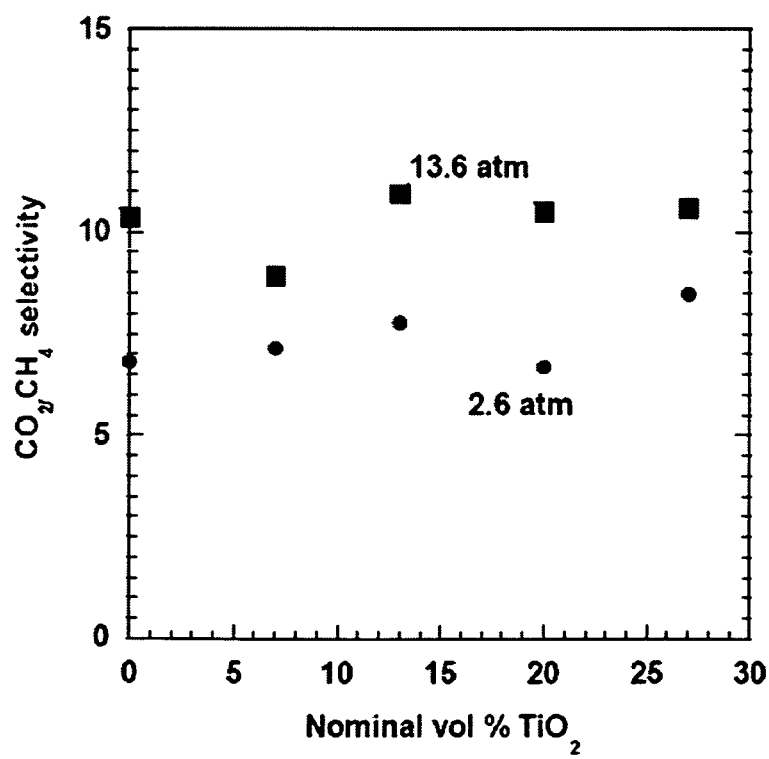

FIGS. 16A and 16B are graphs of $CO_2/H_2$ and $CO_2/H_2$ gas transport properties for one of the nanocomposite of the present invention. FIG. 16A is a graph of the pure gas selectivity for $CO_2/H_2$ in a $TiO_2$ filled 1,2-polybutadiene nanocomposite of the present invention. In this example, the $TiO_2$ had a primary particle diameter of about 5 nm; however, the skilled artisan will recognize that the diameter may be varied to provide different effects, e.g., the diameter may be 1 nm, 2 nm, 3 nm, 4 nm, 5 nm, 6 nm, 7 nm, 8 nm, 9 nm, 10 nm or more or any variation or fraction thereof. Measurements were made in a constant volume variable pressure permeation apparatus, which was maintained at about 35° C. The upstream pressure was about 2.6 atm and about 13.6 atm, and the downstream pressure were maintained below about 0.02 atm.

FIG. 16B is a graph of pure gas selectivity for $CO_2/CH_4$ in $TiO_2$ filled 1,2-polybutadiene. $TiO_2$ used in these materials had a primary particle diameter of about 5 nm. Again, the skilled artisan will recognize that the diameter may be varied. Measurements were made in a constant volume variable pressure permeation apparatus, which was maintained at about 35° C. The upstream pressure was about 2.6 atm and about 13.6 atm, and the downstream pressure was maintained below about 0.02 atm.

Figure 17:
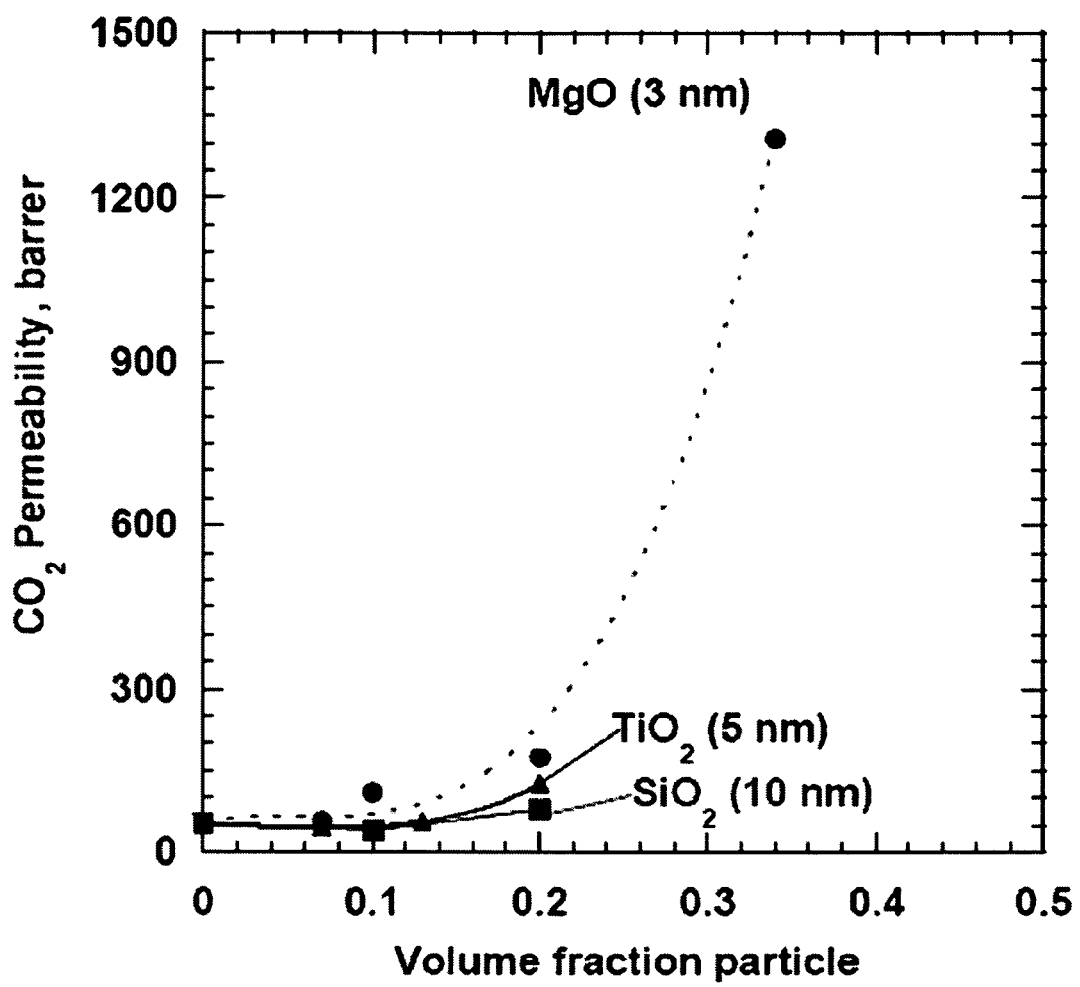
FIG. 17 is a graph of $CO_2$ permeability as a function of nanocomposite concentration of the present invention.

FIG. 17 is a graph of $CO_2$ permeability as a function of nanocomposite concentration for the present invention. The $CO_2$ permeability of 1,2-polybutadiene filled with MgO (○), $TiO_2$ (Δ), and $SiO_2$ (□) nanocompositions is displayed in this graph. The MgO primary particle size was about 3 nm. $TiO_2$ primary particle size was about 5 nm, and $SiO_2$ primary particle size was about 10 nm. Measurements were made in a constant volume variable pressure permeation apparatus, which was maintained at about 35° C. The upstream pressure was about 3 atm, while the downstream pressure was maintained below about 0.02 atm.

Table 5 illustrates the gas transport for cross-linked poly(ethylene glycol) diacrylate filled with $SiO_2$. Measurements were made in a constant volume variable pressure permeation apparatus, which was maintained at 35° C. Upstream pressure was 3 atm, while the downstream pressure was maintained below 0.02 atm.

TABLE 5

|  | $P_{CO2}$ barrer | $P_{H2}$ barrer | $P_{CH4}$ barrer | $P_{N2}$ barrer |
| --- | --- | --- | --- | --- |
| 20 vol % $SiO_2$ | 165 | 22 | 8 | 2.6 |

Figure 18:
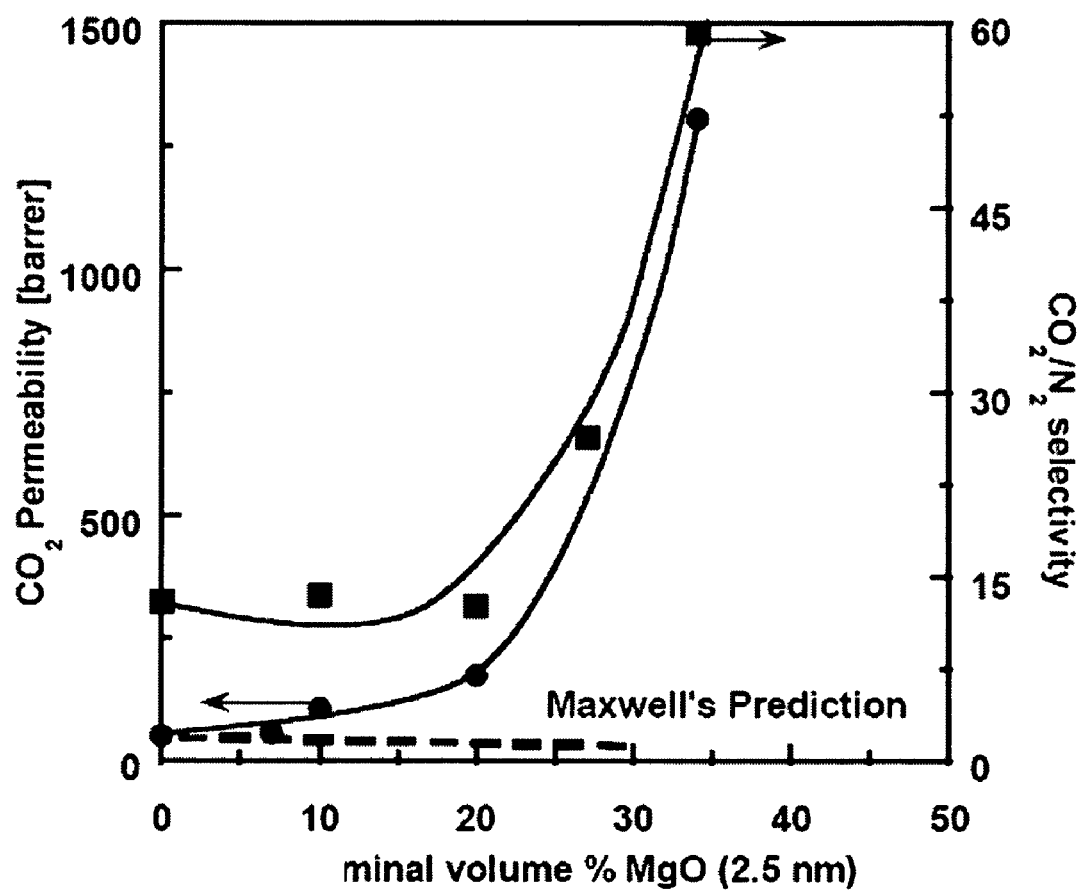
FIG. 18 is a graph of $CO_2$ permeability and $CO_2/N_2$ gas selectivity transport properties as a function of nanocomposite volume.

FIG. 18 is a graph of $CO_2$ permeability and $CO_2/N_2$ gas selectivity transport properties as a function of nanocomposite volume. Pure gas $CO_2$ permeability (○) and pure gas selectivity (□) for $CO_2/H_2$ in MgO filled 1,2-polybutadiene. The structure of 1,2-polybutadiene is illustrated below, where n is an integer. The theoretical Maxwell prediction is included (----). MgO used in these materials had a primary particle diameter of about 3 nm. Measurements were made in a constant volume variable pressure permeation apparatus, which was maintained at about 35° C. The upstream pressure was about 3 atm, and the downstream pressure was maintained below about 0.02 atm.

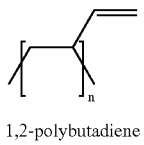

1,2-polybutadiene

Figure 19:
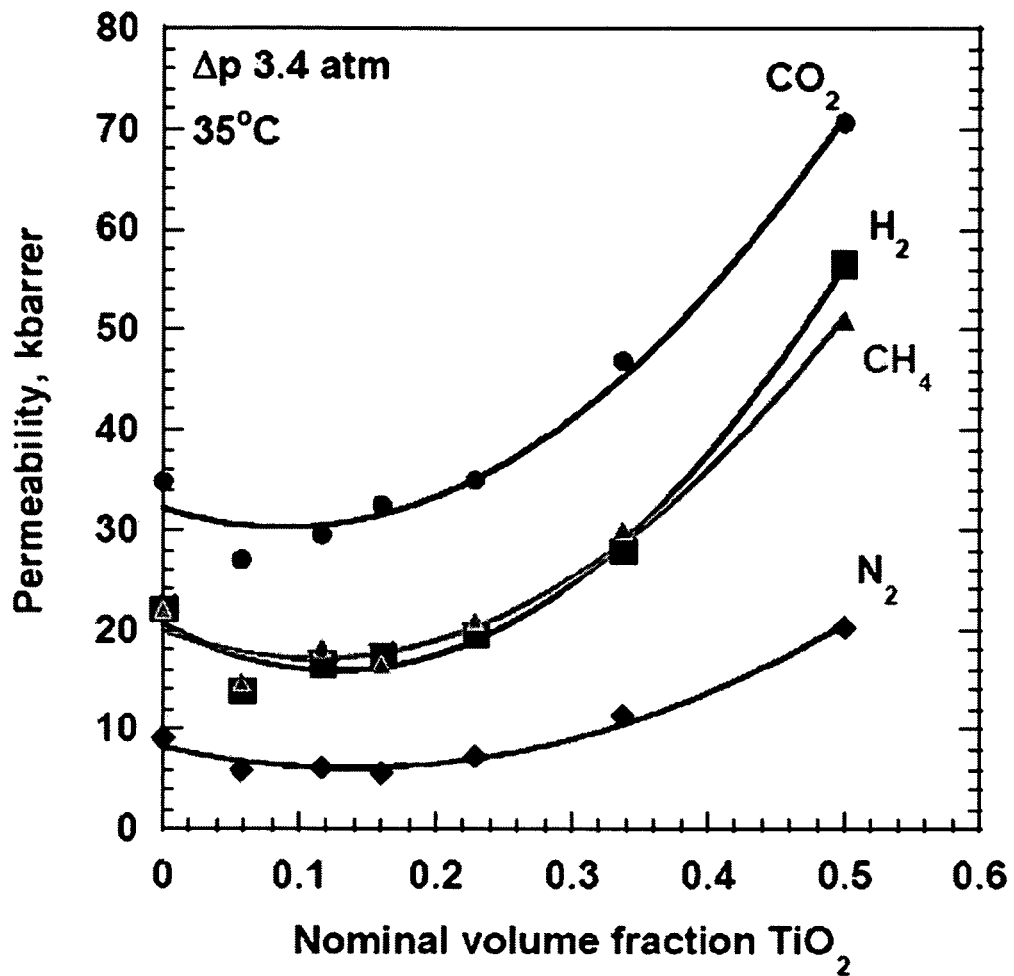
FIG. 19 is a graph of permeability for PTMSP/$TiO_2$ nanocomposites.

FIG. 19 is a graph of permeability for PTMSP/TiO nanocomposites. The pure gas permeability for $CO_2$ (○), $H_2$ (□), $N_2$ (◇), and $CH_4$ (Δ) in $TiO_2$ filled poly(1-trimethylsilyl-propyne) are illustrated. $TiO_2$ used in these materials had a primary particle diameter of about 5 nm. Measurements were made in a constant pressure variable volume permeation apparatus, which was maintained at about 35° C. Upstream pressure was about 4.4 atm, and the downstream pressure was about 1 atm.

Figure 20:
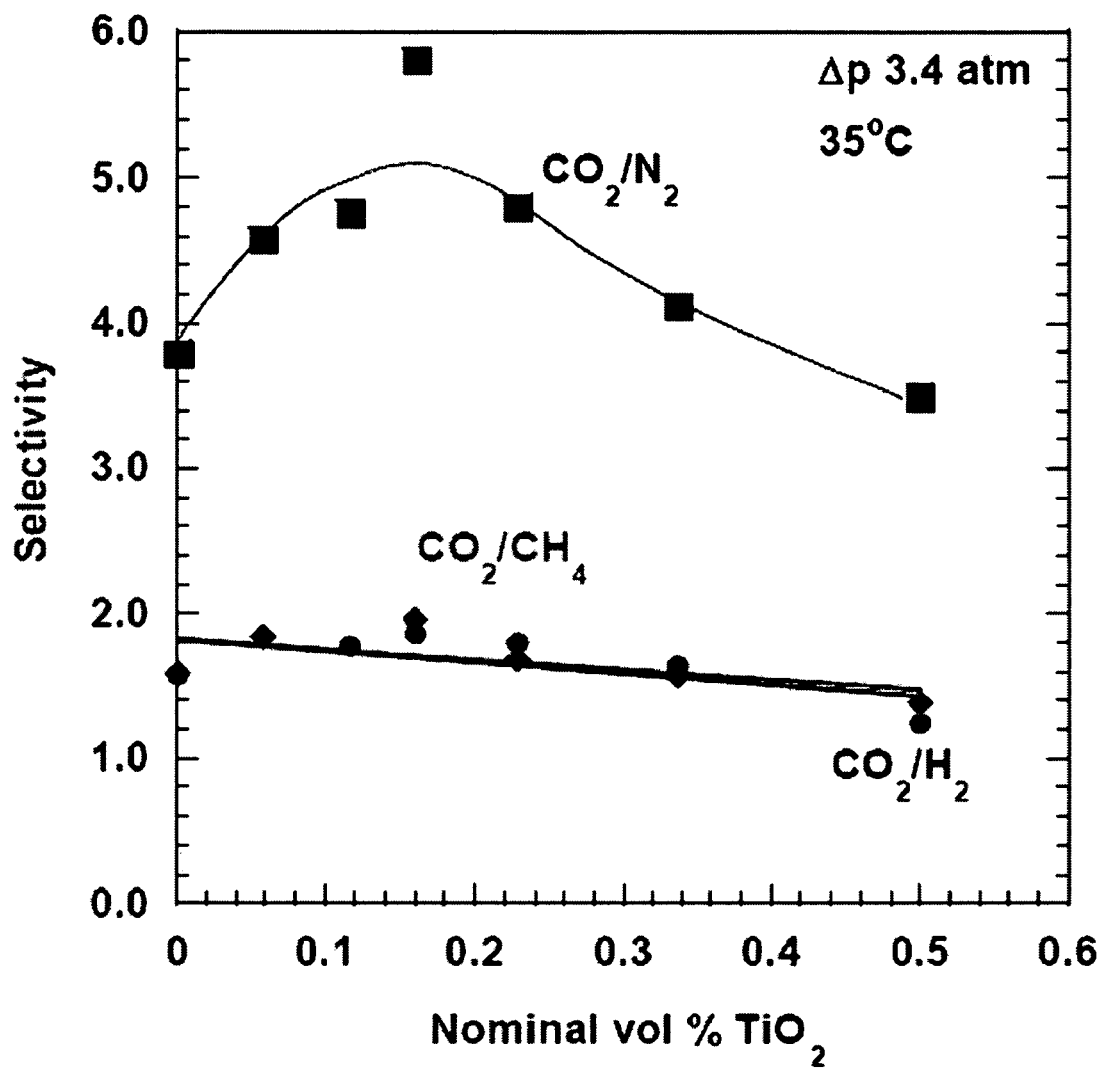
FIG. 20 is a graph of gas selectivity for PTMSP/$TiO_2$ nanocomposites.

FIG. 20 is a graph of gas selectivity for PTMSP/TiO nanocomposites. The pure gas selectivity for $CO_2/H_2$ (○), $CO_2/N_2$ (□), and $CO_2/CH_4$ (◇) in $TiO_2$ filled poly(1-trimethylsilyl-propyne) are illustrated. $TiO_2$ used in these materials had a primary particle diameter of about 5 nm. Measurements were made in a constant pressure variable volume permeation apparatus, which was maintained at about 35° C. Upstream pressure was about 4.4 atm, and the downstream pressure was about 1 atm.

Figure 21:
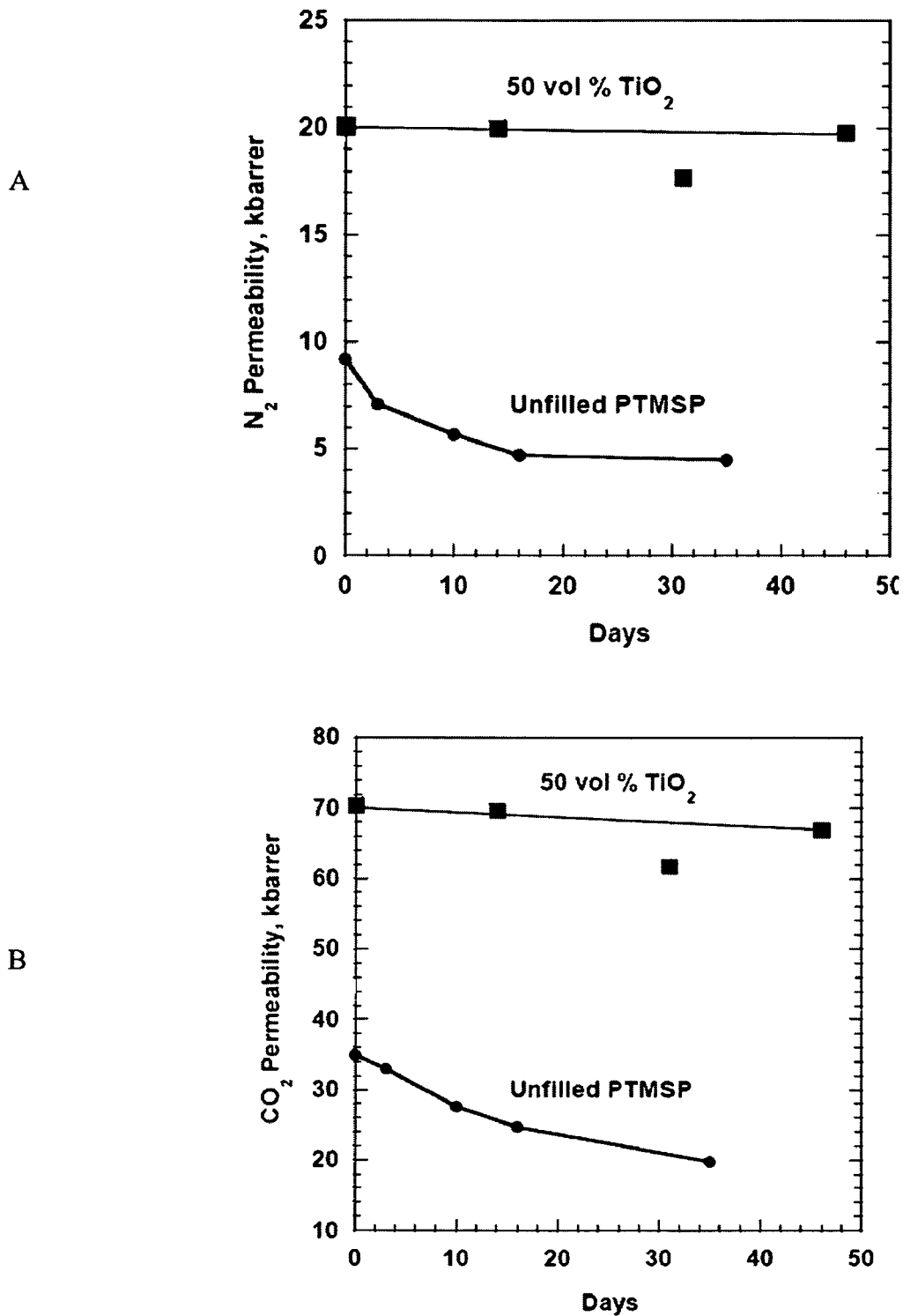
FIGS. 21A and 21B are graphs of gas aging for PTMSP/$TiO_2$ nanocomposites.

FIG. 21A and FIG. 21B are graphs of physical aging in PTMSP/TiO nanocomposites. FIG. 21A is a graph of the pure gas $N_2$ permeability for unfilled poly(1-trimethylsilyl-propyne) (○) and poly(1-trimethylsilyl-propyne) filled with 50 volume percent $TiO_2$ (□). $TiO_2$ used in these materials had a primary particle diameter of about 5 nm. The measurements were made in a constant pressure variable volume permeation apparatus, which was maintained at about 35° C. The upstream pressure was about 4.4 atm, and the downstream pressure was about 1 atm.

FIG. 21B is a graph of the pure gas $CO_2$ permeability for unfilled poly(1-trimethylsilyl-propyne) (○) and poly(1-trimethylsilyl-propyne) filled with 50 volume percent $TiO_2$ (□). $TiO_2$ used in these materials had a primary particle diameter of about 5 nm. Measurements were made in a constant pressure variable volume permeation apparatus, which was maintained at about 35° C. Upstream pressure was about 4.4 atm, and the downstream pressure was 1 atm.

Figure 22:
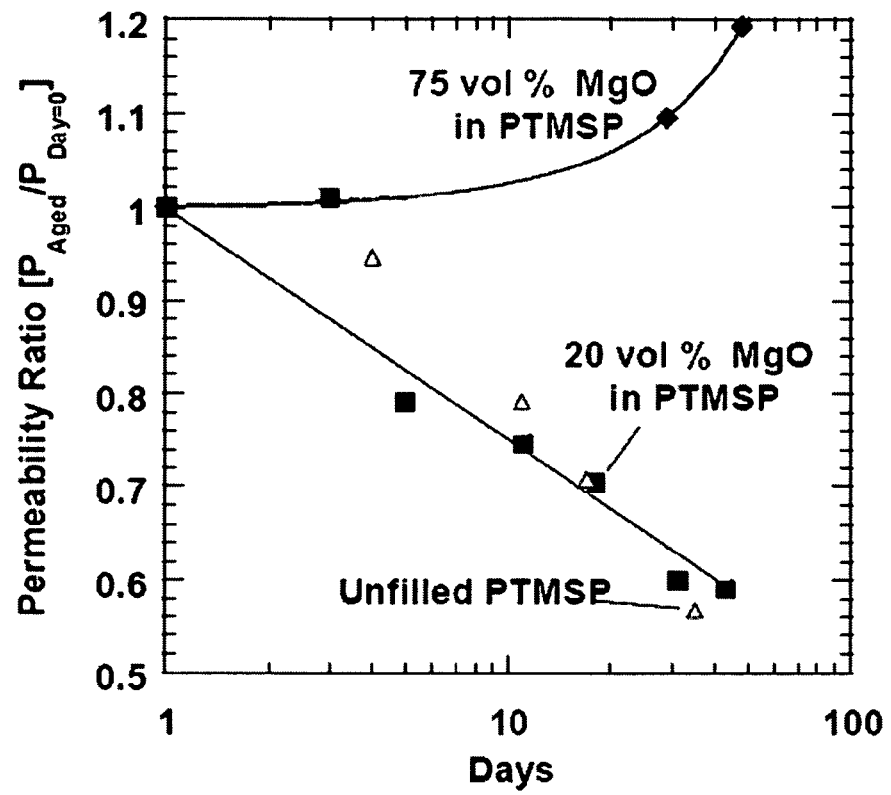
FIG. 22 is a graph of gas aging for PTMSP/MgO nanocomposites.

FIG. 22 is a graph of physical aging in PTMSP/MgO nanocomposites. The pure gas $CO_2$ permeability for unfilled poly(1-trimethylsilyl-propyne) (Δ), poly(1-trimethylsilyl-propyne) filled with about 20 volume percent MgO (□), and poly(1-trimethylsilyl-propyne) filled with about 75 volume percent MgO (◇) as a function of time in days is illustrated. MgO used in these materials had a primary particle diameter of about 3 nm. Measurements were made in a constant pressure variable volume permeation apparatus, which was maintained at about about 35° C. The upstream pressure was about 4.4 atm, and the downstream pressure was about 1 atm.

Figure 23:
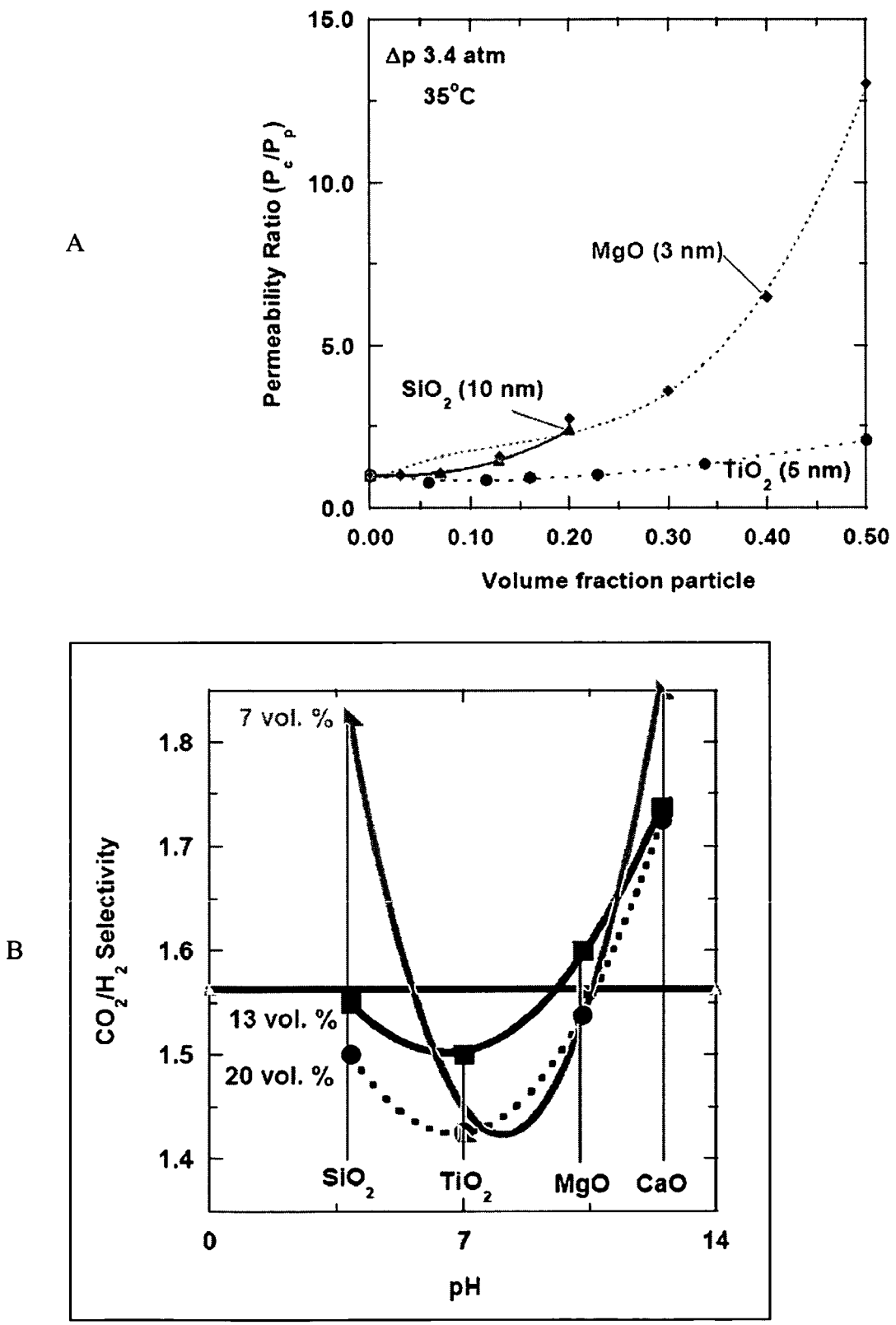
FIGS. 23A and 23B are graphs of particle chemistry affect on permeability for PTMSP.

FIGS. 23A and 23B are graphs of particle chemistry influence on permeability for PTMSP. FIG. 23A is a graph of the pure gas $CO_2$ permeability ratio (Permeability of composite/Permeability of unfilled polymer) for poly(1-trimethylsilyl-propyne) filled with $SiO_2$ (Δ) with a diameter of about 10 nm, poly(1-trimethylsilyl-propyne) filled with $TiO_2$ (○) with a diameter of about 5 nm, and poly(1-trimethylsilyl-propyne) filled with MgO (◇) with a diameter of about 3 nm. The MgO primary particle size was 3 nm. Measurements were made in a constant pressure variable volume permeation apparatus, which was maintained at about 35° C. Upstream pressure was about 4.4 atm, and the downstream pressure was about 1 atm.

FIG. 23B is a graph of the pure gas $CO_2/H_2$ selectivity for unfilled poly(1-trimethylsilyl-propyne) filled with $SiO_2$, $TiO_2$, MgO, and CaO. Loadings of particles were about 7 volume percent (▷), about 13 volume percent (□), and about 20 volume percent (○). The MgO primary particle size was about 3 nm. $TiO_2$ primary particle size was about 5 nm, and $SiO_2$ primary particle size was about 10 nm. CaO primary particle diameter was 8 nm. Measurements were made in a constant pressure variable volume permeation apparatus, which was maintained at about 35° C. Upstream pressure was about 4.4 atm, and the downstream pressure was about 1 atm.

The present invention includes the addition of nanoparticles into polymers. The nanoparticles of the present invention may contain a variety of components and the polymers may include stiff-chain, rigid, glassy polymers, rubbery polymers and elastomeric polymers. In addition, the nanoparticles and/or the polymers may be modified by the addition and/or substituted with one or more halogens, hydroxyl groups, alkyl groups, alkoxy groups, monocyclic aryl, acyl groups and combinations thereof. Furthermore, one or more functional groups may be added of modified on the polymer and/or the nanoparticles, e.g., ROOH, ROSH, RSSH, OH, $SO_3H$, $SO_3R$, $SO_4R$, COOH, $NH_2$, NHR, $NR_2$, $CONH_2$, and NH—$NH_2$, wherein R denotes, e.g., linear or branched hydrocarbon-based chains, capable of forming at least one carbon-based ring, being saturated or unsaturated; alkylenes, siloxanes, silanes, ethers, polyethers, thioethers, silylenes, and silazanes.

For example, the present invention may be used in conjunction with a gas separation membrane or polymer having crosslinked poly(ethylene oxide), wherein the membrane is highly permeable to acid gases.

For example, separation of $CO_2$ from mixtures with $CH_4$, which could be used for natural gas purification, enhanced oil recovery (EOR), landfill gas and biomass gas treatment; recovery of $CO_2$ from flue gas (mixtures of $CO_2$ and $N_2$); removal of $CO_2$ from mixtures with $H_2$ to obtain high pressure and high purity hydrogen product for fuel cells; removal of $H_2S$ from raw natural gas ($H_2S/CH_4$ separation) and from mixtures with $H_2$; dehydration of compressed air ($H_2O$/air separation) and raw natural gas ($H_2O/CH_4$) separation; and removal of $SO_2$ or $NH_3$ from mixtures with nitrogen.

In one embodiment of the invention, provides the addition of nanoparticles into a series of rubbery crosslinked polymeric materials (XLPEO), which are photopolymerized from mixtures of poly(ethylene glycol) diacrylate (PEGDA) and poly(ethylene glycol) methyl ether acrylate (PEG MEA) by UV light is disclosed.

For example, the polymers contain about 83 weight percent of ethylene oxide units that interact favorably with acid gases such as carbon dioxide ($CO_2$), thus providing high selectivity for $CO_2$ over nonpolar gases such as $H_2$. $CO_2$ typically provides a conservative model marker penetrant for $H_2S$, and polymers of interest can be more permeable to $H_2S$ than to $CO_2$. XLPEO-1, prepared from 100% PEGDA exhibits a $CO_2$ permeability of 125 Barrers and a pure gas $CO_2/H_2$ selectivity of 8.2 at 4.4 atm and 35° C. The addition of nanoparticles to the polymer will increase the permeability and/or the gas selectivity.

In addition, the separation performance is further enhanced by introducing PEGMEA into the XLPEO-1 matrix. Copolymers of PEGDA and PEGMEA with high PEGMEA contents have higher permeability and higher selectivity than copolymers with less PEGMEA. For example, XLPEO-2, prepared from 9 weight percent PEGDA and 91 weight percent PEGMEA, exhibits a $CO_2$ permeability of 588 Barrers and a pure gas $CO_2/H_2$ selectivity of 13 at 10 atm and 35° C. Addition increases may be seen through the addition of nanoparticles to the matrix. Other polymers that may be used in conjunction with nanoparticles include, but are not limited to, PMDA-pDDS-b-PEO; BPDA-ODA-b-PEO; PA12-b-PEO; PA12-b-PEO; XLPEO-1; and XPELO-2. The skilled artisan will be able to determine the appropriate concentrations of polymer and nanoparticles to provide the desired separation characteristics. In addition the present invention includes the product made by any of the process or methods disclosed herein.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations can be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A nonporous metal oxide nanoparticle filled polymer with similar gas selectivity and greater gas permeability than a native polymer, wherein the nonporous metal oxide nanoparticle filled polymer comprises:
   one or more nonporous metal oxide nanoparticles dispersed within one or more polymeric materials in a polymer:nanoparticle weight ratio of between 5:1 and 0.5:1, wherein the metal oxide nanoparticle filled polymer behaves as a nanocomposite that has a greater gas permeability than the native polymer.

2. The composition of claim 1, wherein the nonporous metal oxide nanoparticle filled polymer comprises nonporous metal oxide nanoparticles of between 1 to 100 nm in diameter.

3. The composition of claim 1, wherein the one or more polymeric materials comprising a rubbery polymer having a glass transition temperature (Tg) at or below the use temperature.

4. The composition of claim 1, wherein the polymeric material comprising a glassy polymer.

5. The composition of claim 1, wherein the one or more polymeric materials comprises a rigid, glassy polymer having a glass transition temperature (Tg) greater than 150 degrees C.

6. The composition of claim 1, wherein the one or more polymeric materials is a rigid, glassy polymer having a glass transition temperature (Tg) less than 150 degrees C.

7. The composition of claim 1, wherein the one or more nonporous metal oxide nanoparticles comprising one or more atom of Fe, Cr, Al, Ga, In, Hf, Sn, Zr, Mo, Ti, V, Co, Ni, Cu, Y, Ta, W, Pb, B, Nb, Ge, Pr, U, Ce, Er, Nd, Si, Mg, Ca, Ba, Sr, Au or combination thereof.

8. The composition of claim 1, wherein the one or more nonporous metal oxide nanoparticles comprise one or more elements of the periodic table from Groups 2 through 16, the lanthanides and actinides.

9. The composition of claim 1, wherein the diameter of the one or more nonporous metal oxide nanoparticles are between about 1.0 and 500 nm.

10. The composition of claim 1, wherein the polymeric material comprises poly(1-phenyl-2-[p-trimethylsilylphenyl]acetylene, poly(1-trimethylsilyl-1-propyne) or a combination thereof.

11. The composition of claim 1, wherein the polymeric material comprises poly(ethylene octene), polybutadiene, poly(ethylene oxide) or a combination thereof.

12. The composition of claim 1, wherein the polymeric material is a substituted polymer comprising one or more halogens, hydroxyl groups, lower alkyl groups, lower alkoxy groups, monocyclic aryl, lower acyl groups and combinations thereof.

13. The nanocomposite material of claim 1, wherein the concentration of the one or more nonporous metal oxide nanoparticles ranges from about 0 volume % to about 30 volume %.

14. The nanocomposite material of claim 1, wherein the one or more nonporous metal oxide nanoparticles are substantially uniformly distributed within the polymer matrix.

15. A process for removing a gas from a gas mixture, comprising the steps of:
   contacting the gas mixture with a nanocomposite membrane comprising one or more nonporous metal oxide nanoparticles dispersed within one or more polymeric material in a polymer:nanoparticle weight ratio of between 5:1 and 0.5:1, wherein the nonporous metal oxide nanoparticle filled polymer has a greater gas permeability than the native polymer; and
   separating one or more gases from the gas mixture.

16. The process of claim 15, wherein the one or more nonporous metal oxide nanoparticles comprising one or more atom of Fe, Cr, Al, Ga, In, Hf, Sn, Zr, Mo, Ti, V, Co, Ni, Cu, Y, Ta, W, Pb, B, Nb, Ge, Pr, U, Ce, Er, Nd, Si, Mg, Ca, Ba, Sr, Au or combination thereof.

17. The process of claim 15, wherein the diameter of the one or more nonporous metal oxide nanoparticles are between about 1.0 and 500 nm.

18. The process of claim 15, wherein the polymeric material comprises poly(1-phenyl-2-[p-trimethylsilylphenyl] acetylene, poly(1-trimethylsilyl-1-propyne) or a combination thereof.

19. The process of claim 15, wherein the polymeric material comprises poly(ethylene-co-octene), polybutadiene, poly (ethylene oxide) or a combination thereof.

20. The process of claim 15, wherein the one or more nonporous metal oxide nanoparticles are substantially uniformly distributed within the polymer matrix.

21. A method for making a permeable metal oxide nanocomposite membrane with similar gas selectivity and greater gas permeability than the native polymer comprising the steps of:
   adding one or more nonporous metal oxide nanoparticles to a polymeric material in a polymer:nanoparticle weight ratio of between 5:1 and 0.5:1; and
   polymerizing the polymeric material to form a metal oxide nanocomposite membrane, wherein the metal oxide nanocomposite membrane is permeable with gas selectivity similar to the native polymer.

22. The process of claim 21, wherein the one or more nonporous metal oxide nanoparticles comprising one or more atom of Fe, Cr, Al, Ga, In, Hf, Sn, Zr, Mo, Ti, V, Co, Ni, Cu, Y, Ta, W, Pb, B, Nb, Ge, Pr, U, Ce, Er, Nd, Si, Mg, Ca, Ba, Sr, Au or combination thereof.

23. The process of claim 21, wherein the polymeric material comprises poly(1-phenyl-2-[p-trimethylsilylphenyl] acetylene, poly(1-trimethylsilyl-1-propyne) or a combination thereof.

* * * * *

UNITED STATES PATENT AND TRADEMARK OFFICE
CERTIFICATE OF CORRECTION

PATENT NO. : 7,510,595 B2
APPLICATION NO. : 11/409457
DATED : March 31, 2009
INVENTOR(S) : Benny D. Freeman, Scott Mateucci and Haiqing Lin It is certified that error appears in the above-identified patent and that said Letters Patent is hereby corrected as shown below:

Sheet 6 of 23, Figure 6A
Replace X-axis title "Nomial volume %" with --Nominal volume %--

Sheet 6 of 23, Figure 6B
Replace X-axis title "Nomial volume %" with --Nominal volume %--

Sheet 7 of 23, Figure 7
Replace X-axis title "Nomial volume %" with --Nominal volume %--

Sheet 18 of 23, Figure 18
Replace X-axis title "minal volume % MgO" with --Nominal volume % MgO--

Col. 2, Line 28
Replace "mixtures of gas" with --mixtures of gases--

Col. 2, Line 30
Replace "diffusivity play a dominate" with --diffusivity play a dominant--

Col. 2, Line 45
Replace "rates at the sacrifice of high" with --rates sacrificing high--

Col. 4, Line 17
Replace "or combination thereof" with --or combinations thereof--

Col. 11, Line 12
Replace "22.000" with --22,000--

UNITED STATES PATENT AND TRADEMARK OFFICE
CERTIFICATE OF CORRECTION

PATENT NO. : 7,510,595 B2
APPLICATION NO. : 11/409457
DATED : March 31, 2009
INVENTOR(S) : Benny D. Freeman, Scott Mateucci and Haiqing Lin It is certified that error appears in the above-identified patent and that said Letters Patent is hereby corrected as shown below:

Col. 19, Line 14
Replace "permeability verses particle" with --permeability versus particle--

Signed and Sealed this

Twenty-third Day of June, 2009

JOHN DOLL
*Acting Director of the United States Patent and Trademark Office*